(12) United States Patent
Kinpara

(10) Patent No.: US 6,184,638 B1
(45) Date of Patent: Feb. 6, 2001

(54) CONTROL SYSTEM FOR AN INDUCTION MOTOR

(75) Inventor: Yoshihiko Kinpara, Tokyo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/430,754

(22) Filed: Oct. 29, 1999

(51) Int. Cl.$^7$ .................................................. H02P 7/00
(52) U.S. Cl. ........................ 318/432; 318/802; 318/805; 318/800; 318/798
(58) Field of Search .................................. 318/432, 802, 318/805, 800, 798

(56) References Cited

U.S. PATENT DOCUMENTS

| 4,680,526 | * | 7/1987 | Yuki et al. ........................... 318/802 |
| 4,862,054 | | 8/1989 | Schauder . |
| 4,885,520 | | 12/1989 | Sugimoto et al. . |
| 5,160,878 | | 11/1992 | Nagano . |
| 5,959,430 | * | 9/1999 | Yuki et al. ........................... 318/805 |

FOREIGN PATENT DOCUMENTS

| 2312572 | 10/1997 | (GB) . |
| 7-146015 | 6/1905 | (JP) . |

* cited by examiner

Primary Examiner—Karen Masih
(74) Attorney, Agent, or Firm—Leydig, Voit & Mayer, Ltd.

(57) ABSTRACT

An estimated rotation angular velocity ⬜r0 and an estimated secondary resistance Hr0 are processed using a first feedback gain H1 under a condition that a first state deviation E1 is in phase with a quadrature component of an estimated secondary magnetic flux ⬜r01. An estimated primary resistance Rs0 is processed using a second state deviation H2 under a condition that a second state deviation E2 is in phase with an estimated primary current 02. These values are used to control the speed of an induction motor without an angular velocity detector.

17 Claims, 17 Drawing Sheets

CONTROL SYSTEM FOR AN INDUCTION MOTOR

BACKGROUND OF THE INVENTION

1. Field of the Invention

The present invention relates to a control system for controlling the variable speed of an induction motor without an angular velocity detector.

2. Discussion of the Related Art

FIG. 14 is a circuit diagram showing a conventional control system for an induction motor, which is described in "The institute of Electric Engineers of Japan Trans., D", Vol. 112, No.9, p901, 1993 (referred to an article 1). In the figure, reference numeral 1 is excitation-current command computing means; 2 is as induction motor; 3 is torque control means; 4 is current detecting means; and 5 is parameter estimating means.

In the conventional induction-motor control system shown in FIG. 14, the excitation-current command computing means 1 receives a secondary magnetic flux φdr* to be output by the induction motor 2, performs the operation of the following equation (20) in which an AC signal is added (superposed) to a DC signal proportional to the secondary magnetic flux φdr*, and outputs an excitation-current command ids* of the induction motor 2.

[Formula 7]

$$ids^* = (1 + k1 \sing(2\pi f1 t) + k2 \sing(2\pi f2 t))\phi dr^* M \quad (20)$$

where t: time
k1: amplitude of a first superposing signal
f1: frequency of the first superposing signal
k2: amplitude of a second superposing signal
f2: frequency of the second superposing signal It is known that the excitation current must contain at least two frequency components in order to simultaneously estimate a rotation angular velocity and a secondary resistance of the induction motor.

The reason for this will be described. A circuit diagram shown in FIG. 15 is known as a T-type equivalent circuit where an excitation current is fixed in value. In the figure, cos is a slip angular velocity. To estimate a rotation angular velocity of the induction motor is equivalent to estimate a slip angular velocity in the figure since ωr=ω−ωs.

To simultaneously estimate a rotation angular velocity and a secondary resistance of the induction motor from the primary current and the primary voltage of the induction motor, which is controlled at a fixed excitation current, is equivalent to estimate Rr/ωs in the figure. Therefore, the principle makes it impossible to separate those one from the other.

Where the excitation current is not kept constant, ω and ωs are not fixed in value. The ω contains a plurality of components. The T-type equivalent circuit holds at each of the different slip angular velocities ωs for each of the components of the ω. Thus, the induction motor into which the control not keeping the excitation current constant is incorporated can simultaneously estimate the rotation angular velocity and the secondary resistance.

Accordingly, the superposing frequencies f1 and f2 sued are different in value, and in the conventional control system described in the article 1, those frequencies f1 and f2 are f1=1 (Hz)

f2=3 (Hz)

In the article 1, the period of the first superposing signal is 1/f1, and the rating of the induction motor is 3.7 kw. In this sense, this signal is an AC signal having a period longer than a secondary time constant (=Lr/Rr) of the induction motor 2.

When a torque command τm* to be output by the induction motor 2 and an excitation current command ids* from the excitation-current command computing means 1 are input to the torque control means 3, the torque control means 3 receives three-phase primary currents ius and ivs from the current detecting means 4, an estimated rotation angular velocity ω r0 from the current detecting means 4, and an estimated secondary resistance Rr0 from the parameter estimating means 5, and processes those factors so as that an output torque τm of the induction motor follows τm*, and supplies three-phase primary voltages vus, vvs, and vws to the induction motor.

The parameter estimating means 5 includes a measuring unit 6, a gain computing unit 7, a rotation velocity estimating unit 8, a secondary-resistance estimating unit 9, and a primary-resistance estimating unit 10.

The parameter estimating means 5 receives the primary voltage commands vus* and vvs* from the torque control means 3, and the primary currents ius and ivs from the current detecting means 4, and outputs an estimated rotation angular velocity ωr0 and an estimated secondary resistance Rr0.

The measuring unit 6 receives the primary current commands vus* and vvs* from the torque control means 3, the primary currents ius and ivs from the current detecting means 4, a feedback gain G from the gain computing unit 7, an estimated rotation angular velocity ωr0 from the rotation velocity estimating unit 8, and an estimated secondary resistance Rr0 from the secondary resistance estimating unit 9, and an estimated primary resistance Rs0 from the primary-resistance estimating unit 10, and performs the operations mathematical expressions (21), (22) and (23), to thereby produce an estimated primary current Is0, an estimated secondary current Ir0, a state deviation E, and an estimated secondary magnetic flux φr0.

[Formula 8]

$$\frac{d}{dt}\begin{pmatrix} i_{s0} \\ \Phi_{r0} \end{pmatrix} = A_O \begin{pmatrix} i_{s0} \\ \Phi_{r0} \end{pmatrix} + Bv_s - G(i_{s0} - i_s) \quad (21)$$

$$E = i_{s0} - i_s \quad (22)$$

$$i_{r0} = \frac{1}{L_r}(\Phi_{r0} - Mi_{s0}) \quad \text{where} \quad (23)$$

$$A_O = \begin{pmatrix} -\left(\frac{R_{s0}}{\sigma L_s} + \frac{(1-\sigma)R_{r0}}{\sigma L_r}\right)I & \frac{M}{\sigma L_s L_r}\left(\frac{R_{r0}}{L_r}I - \omega_{r0}J\right) \\ \frac{MR_{r0}}{L_r}I & -\frac{R_{r0}}{L_r}I + \omega_{r0}J \end{pmatrix}$$

$$B_O = \begin{pmatrix} \frac{1}{\sigma L_s}I \\ 0 \end{pmatrix}$$

The gain computing unit 7 produces a feedback gain G, which is given by the equation (24) containing the estimated rotation angular velocity ωr0, which is received from the rotational speed estimating unit 8.

$$G = \begin{pmatrix} g_1 I + g_2 J \\ g_3 I + g_4 J \end{pmatrix} \text{ where} \quad (24)$$

$$g_1 = -(k-1)(ar11 + ar22)$$

$$g_2 = -(k-1)ai22$$

$$g_3 = -(k^2-1)(c_x ar11 + ar21) + c_x(k-1)(ar11 + ar22)$$

$$g_4 = c_x(k-1)ai22$$

$$c_x = \frac{\sigma L_s L_r}{M}$$

$$ar11 = -\left(\frac{R_{s0}}{\sigma L_s} + \frac{(1-\sigma)R_{r0}}{\sigma L_r}\right)$$

$$ar12 = \frac{M}{\sigma L_s L_r} \frac{R_{r0}}{L_r}$$

$$ai12 = \frac{-\omega_{r0} M}{\sigma L_s L_r}$$

$$ar21 = \frac{MR_{r0}}{L_r}$$

$$ar22 = -\frac{R_{r0}}{L_r}$$

$$ai22 = \omega_{r0}$$

$k$ = arbitrary positive number

The number of poles of the measuring unit 6 is k times as large as that of the induction motor 2 when the feedback gain G given by the equation (24) is used.

The rotational speed estimating unit 8 receives the estimated secondary magnetic flux φr0 and the state deviation E from the measuring unit 6, and computes an outer product E×φr0, and corrects the estimated rotation angular velocity ωr0, which is used in the measuring unit, by use of an equation (25), and outputs the corrected one.
[Formula 10]

$$\omega_{r0} = \frac{k_{sp}s + k_{si}}{s}(J\Phi_{r0})^T E \quad (25)$$

The secondary-resistance estimating unit 9 receives the estimated secondary current ir0 and the state deviation E from the measuring unit 6, and computes an inner product E·ir0, and corrects the estimated secondary resistance Rr0 used in the measuring unit 6 by use of the equation (26), and outputs the corrected one.
[Formula 11]

$$R_{r0} = -\frac{k_{r2p}s + k_{r2i}}{s}(E \cdot i_{r0}) \quad (26)$$

The primary-resistance estimating unit 10 receives the estimated primary current is0 and the state deviation E from the measuring unit 6, and computes an inner product E·is0, and corrects the estimated primary resistance Rs0 by use of an equation (27) used in the measuring unit 6, and outputs the corrected one.
[Formula 12]

$$R_{s0} = \frac{k_{r1p}s + k_{r1i}}{s}(E \cdot i_{s0}) \quad (27)$$

The parameter estimating means 5, which is thus constructed and operated, outputs an estimated rotation angular velocity ωr0 and an estimated secondary resistance Rr0.

FIG. 17 is a diagram showing the detail of the torque control means 3. In the figure, reference numeral 11 is a torque-current command computing unit; 12 is a primary-angular-velocity computing unit; 13 is an integrator; 14 is a coordinate transformer for transforming a primary current on the static coordinates to that on the rotation coordinates; 15 and 16 are subtractors; 17 and 18 are current controllers; 19 is a coordinate transformer for transforming a primary voltage command on the rotational coordinates into that on the static coordinates; and 20 is a PWM inverter.

The following mathematical expression (28) holds among a generated torque τm, an amplitude φdr of a secondary magnetic flux, and a torque current iqs.
[Formula 13]

$$iqs \propto \tau m/\phi dr \quad (28)$$

Therefore, the torque-current command computing unit 11 divides an input torque command τm* by a secondary-magnetic-flux amplitude computed value φdr1 received from the primary-angular-velocity computing unit 12, multiplies the resultant by a constant number; and outputs the resultant as a torque current command iqs*.

The primary-angular-velocity computing unit 12 receives the input excitation-current command ids*, a torque current command iqs*, an estimated secondary resistance Rr0, and an estimated rotation angular velocity ωr0, and computes a secondary-magnetic- flux amplitude computed value φdr1 and a primary angular velocity ω by use of the following equations (29) and (30).
[Formula 14]

$$\phi_{dr1} = \frac{M}{1 + T_r s} i_{ds}^* \quad (29)$$

$$\omega = \omega_{r0} + \frac{MR_r i_{qs}^*}{L_r \phi_{dr1}} \quad (30)$$

The integrator 13 integrates a primary angular velocity ω, which is received from the primary-angular-velocity computing unit 12, and outputs a phase angle θ.

The coordinate transformer 14 coordinate-transforms the primary currents ius and ivs, which are derived from the current detecting means 4, into those on the rotation 2-axes coordinates in accordance with the phase angle θ.

The subtractor 15 subtracts the excitation current ids from the excitation current command iqs* to produce a difference signal. The subtractor 16 subtracts the torque current iqs* from the torque current command iqs* to produce a difference signal.

The current controller 17 amplifies the difference signal, which is derived from the subtractor 15, so that the excitation current ids follows the excitation current command ids*, and outputs the resultant in the form of a d-axis voltage command vds*.

The current controller 18 amplifies the difference signal, which is derived from the subtractor 16, so that the torque current iqs follows the torque current command iqs* and outputs the resultant in the form of q-axis voltage command vqs*.

The coordinate transformer 19 coordinate-transforms d- and q-axis voltage commands vds* and vqs*, which are derived from the current controllers 17 and 18, into those on the 3-phase static coordinates in accordance with the phase angle θ, and produces 3-phase voltage commands vus*, vvs* and vws*.

The PWM inverter 20 receives the 3-phase voltage commands vus*, vvs* and vws*, and supplies 3-phase primary voltages vus, uvs, and vws to the induction motor 2.

In the thus constructed control system for the induction motor, even when the induction motor 2 is heated and its temperature varies, and the primary and secondary resistance values vary, the estimated primary and secondary resistance follow the primary and secondary variations. Therefore, the control system can control the induction motor without the rotation angular velocity sensor so that the output torque τm of the induction motor 2 follows the torque command rm*.

However, the conventional induction-motor control system has the following problems: 1) Estimation of the primary resistance is impossible in the regenerative region. 2) An accuracy of an estimated secondary resistance depends largely on the primary frequency. 3) Torque ripples occur in the output torque τm. 4) A number of operations are required in preparing a plurality of frequencies of AC components of the excitation current. 5) It is relatively difficult to separately estimate the secondary resistance and the rotation angular velocity.

The first problem 1) above will be described. A vector diagram describing a relationship among the state deviation E, the primary current is, and the estimated primary current is0 is shown in FIG. 16. Discussion will be given by use of the vector diagram.

The primary current is is not coincident in vector with the estimated primary current is0 when a deviation is present between the rotation angular velocity ωr and the estimated rotation angular velocity ωr0, a deviation is present between the secondary resistance Rr and the estimated secondary resistance Rr0, and a deviation is present between the primary current rs and the estimated primary current is.

Where a deviation is present between the estimated value and the true value, a relationship among the primary current is, the estimated primary current is0, and the state deviation is mathematically expressed as E=(is0−is) and those vectors are depicted as shown in FIG. 16.

The coordinates in FIG. 16 are the d-q axes plane (static coordinates) which rotate at a frequency ω in synchronism with the estimated secondary magnetic flux φr0.

The primary resistance estimating unit 10 estimates an estimated primary resistance by performing the operation of the equation (27). The integrated term (is0·E) in the equation is the inner product of the estimated primary current is0 and the state deviation (primary current error) (E).

Where the amplitude |is0| of the estimated primary current is constant, the integrated term takes a value proportional to a component being in phase with the estimated primary current is0 of the state deviation E.

FIG. 18A is a vector diagram showing a relationship between the estimated primary current is0 and the state deviation E when a difference (error) is present between the primary resistance Rs and the estimated primary resistance Rs0 of the induction motor.

It is assumed that when a phase difference between is0 and E, E=ξα, E is Eα, and that when a phase difference ξ between is0 and E is ξβ, E=Eβ.

When the phase difference is ξα, the value of the integrated term E·is0 (=|E||is0|cos ξ) is smaller than that when the phase difference ξ is 0°. Therefore, the operation of the equation (27) is sensitive to noise, and improvement of its estimating response is impossible.

When the phase difference is ξβ, a sign of the integrated term (E·is0) is inverted. If the equation (27) is operated under this condition, the equation of the estimated primary resistance forms a positive feedback loop, and diverges.

In summary, when |ξ|90°, the estimating operation (performing of the operation of the equation (27)) is stable, and the integrated term (E·is0) becomes small as |ξ| approaches to 90°. When |ξ|=90°, the (E·is0) is 0 in value and hence the estimating operation is impossible. When |ξ|<90°, the estimating operation is unstable.

Consequently, it is desirable that the state deviation E is in phase with the estimated primary current is0 (phase difference ξ=0°). In this condition, the estimating operation of the primary resistance is stable and highly accurate.

FIG. 19A is a graph showing an exemplary relationship between the phase difference ξ and the primary angular velocity ω, which is derived from the conventional parameter estimating means 5 (rotation angular velocity ωr is 100 (rad/s)). In the figure, the abscissa represents an angular velocity (i.e., the primary angular velocity ω) of the estimated primary current is0, and the ordinate represents an phase difference ξ between the estimated primary current is0 and the status deviation E.

In FIG. 19A, "k" represents a parameter of the gain computing unit 7. As seen, the ξ–ω characteristic varies with the parameter "k". Where "k" is large, |ξ|>90° and the equation (27) of the estimated primary resistance Rs0 diverges.

Further, a frequency region where ωr0<100 (rad/s) contains a region where |ξ|>90°. This fact implies that the estimating operation of the estimated primary resistance diverges in a region where the primary angular velocity is lower than the rotation angular velocity, viz., in the regenerative region.

As seen from FIG. 19A, in the conventional induction motor control system, the phase difference ξ does not take a desired value (0°, constant) for in the specific region of the primary angular velocity ω. Therefore, the estimating operation of the estimated primary resistance is instable, for example, its response is poor or it diverges. This leads to degradation of the accuracy and the response of operating the rotation angular velocity ωr0 and the estimated secondary resistance Rr0, and diverging in their operations.

In this state, the rotation angular velocity ωr0 and the estimated secondary resistance Rr0, which contain errors, are input to the torque control means 3. The output torque τm fails to follow the torque command τm* or another instable phenomenon occurs.

The second problem of 2) above will be described.

The secondary-resistance estimating unit 9 operates the equation (26) for producing an estimated secondary resistance. In the equation, the integrated term (ir0·E) is the inner product of the estimated secondary current ir0 and the state deviation (primary current error) E.

If the amplitude |ir0| of the estimated secondary current is fixed in value, the integrated term (ir0·E) takes a value proportional to a component being in phase with the estimated secondary current ir0 of the state deviation E.

FIG. 18B is a vector diagram showing a relationship between the estimated secondary current ir0 and the state deviation E when a difference (error) is present between the secondary resistance Rr and the estimated secondary resistance Rr0.

It is assumed that E=Eρ when the phase difference ξ between the estimated secondary current ir0 and the state deviation E is phase difference ξρ, and that E is Eσ when the phase difference ξ between the estimated secondary current ir0 and the state deviation is ξσ.

When the phase difference=ξσ, the integrated term (ir0·E) (=|E||ir0|cos ξ) is smaller in value than when the ξ=0°. In this case, the operation of the equation (26) is sensitive to noise, and its response improvement is impossible.

When the phase difference=ξσ, the sign of the value of the integrated term (ir0·E) is inverted. In this state, the equation

(26) of the estimated secondary resistance forms a positive feedback loop, and diverges.

In summary, when $|\xi|<90°$, the secondary-resistance estimating operation is stable, but as $|\xi|$ approaches to 90°, the integrated term (ir0·E) becomes small. When $|\xi|=90°$, (ir0·E)=0 and the estimating operation is impossible. When $|\xi|>90°$, the estimating operation is unstable.

As seen, it is desirable that the state deviation E is in phase with the estimated secondary current ir0 (phase difference $\xi=0°$). Where this condition is satisfied, the estimating operation of the secondary resistance estimation is stable and highly accurate.

FIG. 20A is a graph showing an exemplary relationship between the phase difference $\xi$ and the primary angular velocity ω, which are derived from the conventional parameter estimating means 5 (rotation angular velocity ωr=100 (rad/s). In the graph, the abscissa represents the angular velocity of the ir0 (i.e., primary angular velocity ω), and the ordinates represents a phase difference $\xi$ between the ir0 and the E.

In FIG. 20A, "k" represents a parameter "k" in the gain computing unit 7. As seen, a profile of the $\xi$–ω characteristic varies depending on the value of the parameter "k". When "k" is small, $|\xi|>90°$ and the equation of the estimated secondary resistance Rr0 diverges.

In high frequencies, $\xi \doteq -90°$ irrespective of the value of "k". This state means that (ir0·E)=0, and that the estimating operation of the secondary resistance is impossible.

As seen from FIG. 20A, in the conventional control system for the induction motor, the phase difference $\xi$ cannot take a desired value. Therefore, the operation for estimating the secondary resistance is slow in its response or diverges (viz., it is unstable). The result is that the accuracy and response of the estimated rotation angular velocity ωr0 and the estimated primary resistance Rs0 are deteriorated or sometimes the operated value diverges.

In this state, the estimated rotation angular velocity ωr0 and the estimated secondary resistance Rr0, which contain errors, are input to the torque control means 3. As a result, the output torque τm fails to follow the torque command τm* or the estimating operation is unstable.

The third problem 3) above will then be described. FIG. 21 is a graph showing a transfer characteristic from the excitation current ids to (ø dr/M) and idr. The first and second frequency coefficients of the conventional control system in which an AC signal is given by the equation (20) contain frequency components sufficiently shorter in periods than the reciprocal (number) of the secondary time constant, 1/Tr.

When the secondary magnetic-flux amplitude φdr of the induction motor 2 varies, the value of the mutual inductance M varies due to magnetic saturation. Therefore, the secondary magnetic-flux amplitude Φdr being fixed in value is desirable to secure a desired torque in the control of the induction motor.

As seen from the FIG. 21, when the excitation current ids contains frequency components shorter in period than 1/Tr, the secondary magnetic-flux amplitude ødr also contains those frequency components. Therefore, the mutual inductance M also contains those frequency components. The AC components appear as torque ripples in the output torque τm, and hence it is not coincident with the torque command τm*.

The fourth problem 4) above will now be described.

In the conventional induction-motor control system, to prepare "n" kinds of AC components of the excitation current, it is necessary to perform, "n" times, the operations of "k1 sin(2πf1t)+k2 sin(2πf2t)+k3sin(2πf3t)+. . . kn sin (2πfnt) and the operations of the sine function. The operation of the sine function is more complicated than the operations of addition, subtraction, and multiplication, and hence consumes much time.

Finally, the fifth problem 5) above will be described.

The conventional induction-motor control system estimates a rotation angular velocity by use of the quadrature component of the estimated secondary magnetic flux of the state deviation E $\{(J\emptyset r0)^T E\}$ (equation (25)). Further, it estimates a secondary resistance by use of the component (E·ir0) of the state deviation E being in phase with the estimated secondary current ir0 (equation (26)).

Where the frequencies of the AC components of the excitation current ids are low or their amplitudes are small, the d-axis component idr of the secondary current is small. Where the d-axis component idr is small, the qu-axis component is dominant. In this case, the secondary current is substantially equal to the component (q-axis component) orthogonal to the estimated secondary magnetic flux. Therefore, the quadrature component $\{(J\emptyset r0)^T E\}$ is substantially equal in value to the in-phase component (E·ir0). Thus, the function of the quadrature component of the estimated secondary magnetic flux is used for both the rotational speed estimation and the secondary resistance estimation. Therefore, it is impossible to estimate the secondary resistance and the rotation angular velocity separately.

SUMMARY OF THE INVENTION

The present invention was made to solve the above-mentioned problems of the conventional control system for the induction motor, and has an object to provide a control system for an induction motor which is capable of estimating the primary resistance, the secondary resistance, and the rotation angular velocity in stable and high response manner while being independent of operating conditions, such as output torque and rotational angular speed, and hence is capable of controlling the rotational angular velocity and the output torque of an induction motor stably and highly accurately.

A first broad aspect of the present invention provides a first control system for an induction motor comprising:

current detecting means for detecting a primary current of an induction motor;

excitation-current command computing means for receiving a secondary magnetic flux command to be output by the induction motor, and processing an AC signal and a DC signal proportional to the secondary magnetic flux command, to thereby produce an excitation current command of the induction motor;

torque control means for receiving a torque command to be output by the induction motor and the excitation current command, and processing the estimated rotation angular velocity, the estimated secondary resistance and the primary current, and the torque control means controlling a primary voltage of the induction motor so that an output torque of the induction motor follows the torque command;

first parameter estimating means for processing estimated primary resistance, the primary voltage and the primary current of the induction motor, to thereby produce the estimated rotation angular velocity and the estimated secondary resistance; and second parameter estimating means for processing the estimated rotation angular velocity, the estimated secondary resistance, the primary voltage and the primary current, to thereby produce the estimated primary resistance;

wherein the first parameter estimating means includes
- a) a first measuring unit for processing the estimated primary resistance, the estimated secondary resistance, the estimated rotation angular velocity, a first feedback gain, the primary voltage and the primary current, to thereby produce estimated secondary current, estimated secondary magnetic flux and first state deviation,
- b) a rotational-speed estimating unit for processing the first state deviation and the estimated secondary magnetic flux, which are derived from the first measuring unit, to thereby produce the estimated rotation angular velocity,
- c) a secondary-resistance estimating unit for processing the first state deviation and the estimated secondary current, which are derived from the first measuring unit, to thereby produce the estimated secondary resistance, and
- d) a first gain computing unit for processing the estimated rotation angular velocity derived from the rotational-speed estimating unit, to thereby produce the first feedback gain so that the first state deviation contains a component orthogonal to the estimated secondary magnetic flux, and the second parameter estimating unit includes
- a) a second measuring unit for processing the estimated primary resistance, the secondary resistance, the estimated rotation angular velocity, a second feedback gain, the primary voltage, and the primary current, to thereby produce an estimated primary current and a second state deviation,
- b) a primary-resistance estimating unit for processing the second state deviation and the estimated primary current, to thereby produce the estimated primary resistance, and
- c) a second gain computing unit for processing the rotation angular velocity derived from the rotational-speed estimating unit, to thereby produce the second state deviation so that the first state deviation contains a component being in phase with the estimated primary current.

In the first control system, the secondary-resistance estimating unit processes the first state deviation, the estimated secondary magnetic flux and the estimated secondary current, which are derived from the first measuring unit, to thereby produce an estimated secondary resistance.

Also, in the first induction-motor control system, the secondary-resistance estimating unit executes a process by use of the product of a component being in phase with an estimated secondary magnetic flux contained the first state deviation and another component being in phase with the estimated secondary magnetic flux contained in the estimated secondary current, to thereby produce an estimated secondary resistance.

In the first induction-motor control system, the secondary-resistance estimating unit operates the following equation (1) defining the estimated secondary resistance.

A second broad aspect of the present invention provides a second control system for an induction motor comprising:
- current detecting means for detecting a primary current of an induction motor;
- excitation-current command computing means for receiving a secondary magnetic flux command to be output by the induction motor, and executing a process by use of the secondary magnetic flux command, to thereby produce an excitation current command of the induction motor;
- torque control means for receiving a torque command to be output by the induction motor and the excitation current command, and processing the estimated rotation angular velocity, the estimated secondary resistance and the primary current, and the torque control means controlling a primary voltage of the induction motor in accordance with the result of the processing so that an output torque of the induction motor follows the torque command;
- first parameter estimating means for processing estimated primary resistance, the estimated secondary resistance, the primary voltage and the primary current of the induction motor, to thereby produce the estimated rotation angular velocity; and
- second parameter estimating means for processing the estimated rotation angular velocity, the primary voltage and the primary current, to thereby produce the estimated primary resistance and the estimated secondary resistance;

wherein the first parameter estimating means includes
- a) a first measuring unit for processing the estimated primary resistance, the estimated secondary resistance, the estimated rotation angular velocity, a first feedback gain, the primary voltage and the primary current, to thereby produce an estimated secondary magnetic flux and a first state deviation,
- b) a rotational-speed estimating unit for processing the first state deviation and the estimated secondary magnetic flux, which are derived from the first measuring unit, to thereby produce the estimated rotation angular velocity,
- c) a first gain computing unit for processing the estimated rotation angular velocity derived from the rotational-speed estimating unit, to thereby produce the first feedback gain so that the first state deviation contains a component orthogonal to the estimated secondary magnetic flux, and the second parameter estimating unit includes
- a) a second measuring unit for processing the estimated primary resistance, the secondary resistance, the estimated rotation angular velocity, a second feedback gain, the primary voltage, and the primary current, to thereby produce an estimated primary current and a second state deviation,
- b) a primary-resistance estimating unit for processing the second state deviation and the estimated primary current, to thereby produce the estimated primary resistance, and
- c) a secondary-resistance estimating unit for processing the estimated primary resistance derived from the primary-resistance estimating unit, to thereby produce the estimated secondary resistance,
- d) a second gain computing unit for processing the rotation angular velocity derived from the rotational-speed estimating unit, to thereby produce the second state deviation so that the first state deviation contains a component being in phase with the estimated primary current.

In any of the first and second inductor-motor control system, when a deviation is produced between the rotation angular velocity and the estimated rotation angular velocity of the induction motor, the first gain computing unit produces a first feedback gain causing a component orthogonal to the estimated secondary flux contained in a first state deviation, and when a deviation is produced between the primary resistance and the estimated primary resistance of the induction motor, the second gain computing unit produces a second feedback gain causing a component being in phase with the estimated primary flux contained in a second state deviation.

In any of the first and second induction-motor control system, the first measuring unit performs the operations of equations (2), (3) and (4), the first gain computing unit performs the operation of an equation (5) defining the first feedback gain, the rotational-speed estimating unit performs the operation of an equation (6) defining the estimated rotation angular velocity, the second measuring unit performs the operations of equations (7), (8) and (9), the second gain computing unit performs the operation of an equation (10) defining the second feedback gain, and the primary-resistance estimating unit performs the operation of an equation (11) defining the primary resistance.

Further, the mathematical expression defining the estimated rotation angular velocity is an equation (6A) which is formed by dividing the equation (6) by the reciprocal number of the square of the estimated secondary flux, and the mathematical expression defining the estimated primary resistance is an equation (11A) which is formed by dividing the equation (11) by the reciprocal number of the square of the estimated primary current.

A third broad aspect of the present invention provides a third control system for an induction motor comprising:

current detecting means for detecting a primary current of an induction motor;

excitation-current command computing means for receiving a secondary magnetic flux command to be output by the induction motor, and processing an AC signal and a DC signal proportional to the secondary magnetic flux command, to thereby produce an excitation current command of the induction motor;

torque control means for receiving a torque command to be output by the induction motor and the excitation current command, and processing the estimated rotation angular velocity, the estimated secondary resistance and the primary current, and the torque control means controlling a primary voltage of the induction motor so that an output torque of the induction motor follows the torque command; parameter estimating means for processing the primary voltage and the primary current of the induction motor, to thereby produce the estimated rotation angular velocity and the estimated secondary resistance;

wherein the parameter estimating means includes a) a measuring unit for processing estimated primary resistance, the estimated secondary resistance, the estimated rotation angular velocity, a feedback gain, the primary voltage and the primary current, to thereby produce estimated secondary current, estimated secondary magnetic flux and state deviation, b) a rotational-speed estimating unit for processing the state deviation and the estimated secondary magnetic flux, which are derived from the measuring unit, to thereby produce the estimated rotation angular velocity, c) a secondary-resistance estimating unit for processing the state deviation, the estimated secondary magnetic flux, and the estimated secondary current, which are derived from the measuring unit, to thereby produce the estimated secondary resistance, and d) a primary-resistance estimating unit for processing the estimated secondary resistance derived from the secondary-resistance estimating unit, to thereby produce the estimated primary resistance, e) a gain computing unit for processing the estimated rotation angular velocity derived from the rotational-speed estimating unit, to thereby produce the feedback gain so that the state deviation contains a component orthogonal to the estimated secondary magnetic flux, f) when a deviation is produced between the rotation angular velocity and the estimated rotation angular velocity of the induction motor, the gain computing unit produces a feedback gain causing a component orthogonal to the estimated secondary flux contained in the state deviation, and g) the secondary-resistance estimating unit executes a process by use of the product of a component being in phase with an estimated secondary magnetic flux contained the state deviation and another component being in phase with the estimated secondary magnetic flux contained in the estimated secondary current, to thereby produce an estimated secondary resistance.

The induction-motor control system, wherein the measuring unit performs the operations of equations (14), (15) and (16), the gain computing unit performs the operation of an equation (17) defining the feedback gain, the rotational-speed estimating unit performs the operation of an equation (18) defining the estimated rotation angular velocity (18), and the secondary-resistance estimating unit performs the operation of an equation (19) defining the estimated secondary resistance In any of the first to third induction-motor control system, excitation-current command computing means receives a secondary magnetic flux command to be output by the induction motor, and processes an AC signal not containing AC components whose periods are longer than a secondary time constant of the induction motor, and a DC signal proportional to the secondary magnetic flux command, to thereby produce an excitation current command of the induction motor.

In any of the first to third induction-motor control system, excitation-current command computing means receives a secondary magnetic flux command to be output by the induction motor, and processes an AC signal formed by frequency modulating a sine wave signal, and a DC signal proportional to the secondary magnetic flux command, to thereby produce an excitation current command of the induction motor.

BRIEF DESCRIPTION OF THE DRAWINGS

FIG. 8 is a vector diagram showing an operation of the first gain computing unit 7a.

DETAILED DESCRIPTION OF THE PREFERRED EMBODIMENTS

Now, a description will be given in more detail of preferred embodiments with reference to the accompanying drawings.

<Embodiment 1>

Figure 1:
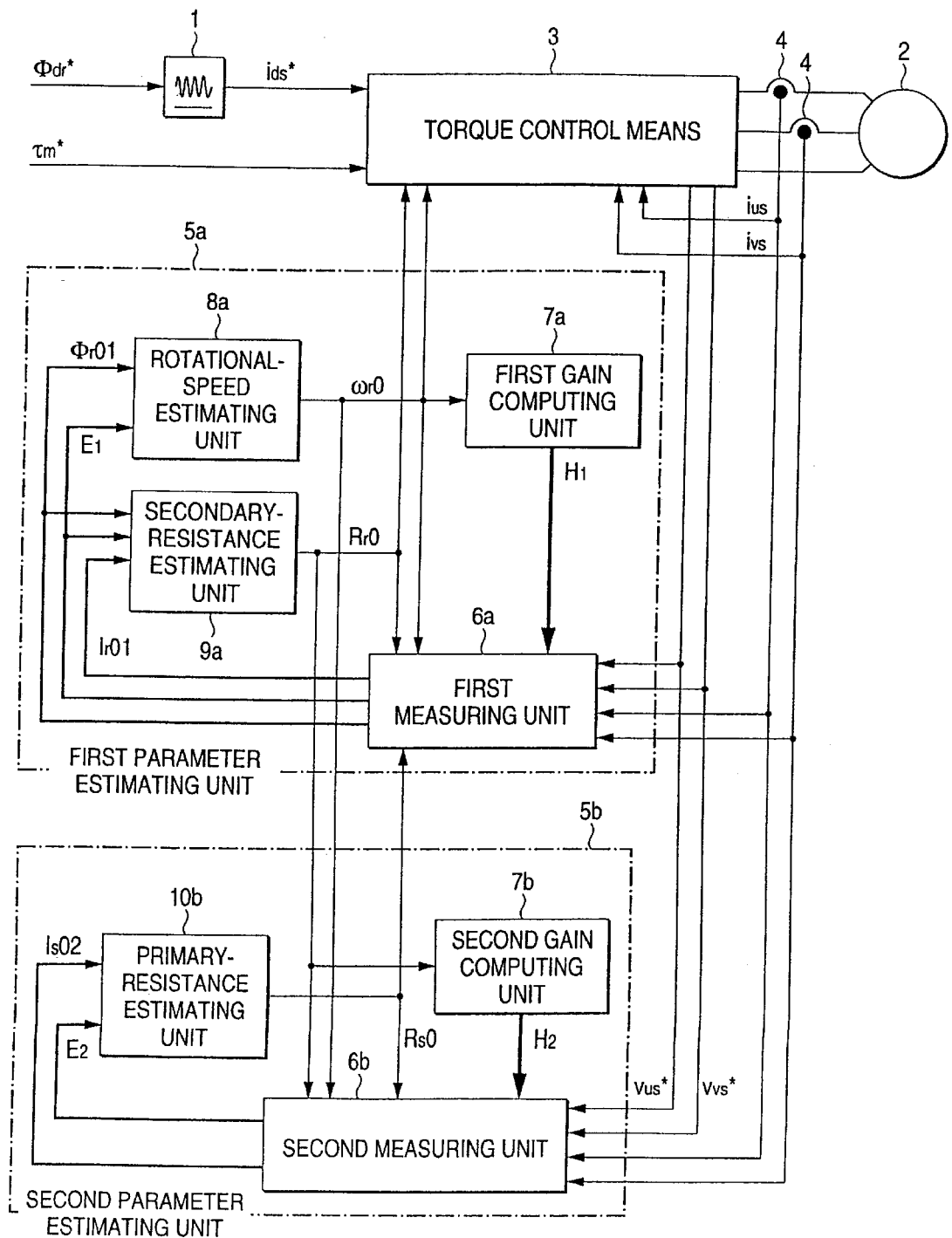
FIG. 1 is a block diagram showing a control system for an induction motor which is an embodiment 1 of the present invention.

FIG. 1 is a block diagram showing a control system for an induction motor which is an embodiment 1 of the present invention. In the figure, reference numerals 1 to 4 are the same as the corresponding ones of the conventional induction-motor control system as already described; 5a is first parameter estimating means; 5b is a second parameter estimating unit; 6a is a first measuring unit; 6b is a second measuring unit; 7a is a first gain computing unit; 7b is a second gain computing unit; 8a is a rotational-speed estimating unit; 9a is secondary-resistance estimating unit; and 10b is a primary-resistance estimating unit.

As shown, the first parameter estimating means 5a includes the first measuring unit 6a, the first gain computing unit 7a, the rotational-speed estimating unit 8a, and the secondary-resistance estimating unit 9a. The first parameter estimating means 5a receives the primary voltage commands vus* and vvs* from the torque control means 3, the primary currents ius and ivs from the current detecting means 4, and estimated primary resistance Rs0 from the second parameter estimating unit 5b. The first parameter estimating means 5a outputs an estimated rotation angular velocity ωr0 and an estimated secondary resistance Rr0.

The first measuring unit 6a receives the primary voltage commands vus* and vvs*, the primary currents ius and ivs, a first feedback gain from the first gain computing unit 7a, an estimated rotation angular velocity ωr0 from the rotational-speed estimating unit 8a, an estimated secondary resistance Rr0 from the secondary-resistance estimating unit 9a, and an estimated primary resistance Rs0 from the second parameter estimating unit 5b, and computes an estimated secondary current ir01, a first state deviation E1, and an estimated secondary flux ør0 by operating the equations (2), (3) and (4) by use of those factors received.

The numeral "1" attached to the ends of denotations of the estimated secondary current ir01 and the estimated secondary flux ør01 are used for indicating those produced as the result of the operations by the first parameter estimating means 5a. Those will frequently be referred to generally as "first estimated secondary current and the like".

Similarly, numeral "2" is attached to the ends of the results of the operations by the second parameter estimating unit 5b, and those results will frequently be referred generally as "second estimated magnetic flux and the like".

[Formula 15]

$$\frac{d}{dt}\begin{pmatrix} \Phi_{s01} \\ \Phi_{r01} \end{pmatrix} = A \begin{pmatrix} \Phi_{s01} \\ \Phi_{r01} \end{pmatrix} + Bv_s - H_1 E_1 \tag{2}$$

$$\begin{pmatrix} i_{s01} \\ i_{r01} \end{pmatrix} = C_1 \begin{pmatrix} \Phi_{s01} \\ \Phi_{r01} \end{pmatrix} \tag{3}$$

$$E_1 = i_{s01} - i_s \tag{4}$$

$$H_1 = P_1 C^T R^{-1} \tag{5}$$

$$\omega_{r0} = \frac{k_{sp}s + k_{si}}{s}(J\Phi_{r01})^T E_1 \tag{6}$$

$$\frac{d}{dt}\begin{pmatrix} \Phi_{s02} \\ \Phi_{r02} \end{pmatrix} = A \begin{pmatrix} \Phi_{s02} \\ \Phi_{r02} \end{pmatrix} + Bv_s - H_2 E_2 \tag{7}$$

$$i_{s02} = C \begin{pmatrix} \Phi_{s02} \\ \Phi_{r02} \end{pmatrix} \tag{8}$$

$$E_2 = i_{s02} - i_s \tag{9}$$

$$H_2 = P_2 C^T R^{-1} \tag{10}$$

$$R_{r0} = -\frac{k_{rlp}s + k_{rli}}{s}(i_{s02} \cdot E_2) \tag{11}$$

[Formula 16]
where $$A = \begin{pmatrix} a_{11}I & a_{12}I \\ a_{21}I & a_{22}I + \omega_{r0}J \end{pmatrix} \quad v_s = \begin{pmatrix} v_{as} \\ v_{bs} \end{pmatrix}$$

$$B = \begin{pmatrix} I \\ 0 \end{pmatrix} \quad i_s = \begin{pmatrix} i_{as} \\ i_{bs} \end{pmatrix}$$

$$C_1 = \begin{pmatrix} c_{11}I & c_{12}I \\ c_{21}I & c_{22}I \end{pmatrix} \quad i_{s01} = \begin{pmatrix} i_{as1} \\ i_{bs1} \end{pmatrix}$$

$$C = (c_{11}I \quad c_{12}I) \quad i_{s02} = \begin{pmatrix} i_{as2} \\ i_{bs2} \end{pmatrix}$$

$$\zeta^{-1} = \frac{1}{L_s L_r - M^2} \quad \Phi_{s01} = \begin{pmatrix} \phi_{as1} \\ \phi_{bs1} \end{pmatrix}$$

$$a_{11} = -\zeta^{-1} L_r R_{s0} \quad \Phi_{s02} = \begin{pmatrix} \phi_{as2} \\ \phi_{bs2} \end{pmatrix}$$

$$a_{12} = \zeta^{-1} M R_{s0} \quad \Phi_{r02} = \begin{pmatrix} \phi_{ar2} \\ \phi_{br2} \end{pmatrix}$$

$$a_{21} = \zeta^{-1} M R_{r0} \quad I = \begin{pmatrix} 1 & 0 \\ 0 & 1 \end{pmatrix}$$

$$a_{22} = -\zeta^{-1} L_s R_{r0} \quad J = \begin{pmatrix} 0 & -1 \\ 1 & 0 \end{pmatrix}$$

$$c_{11} = \zeta^{-1} L_r$$

$$c_{12} = -\zeta^{-1} M$$

$$c_{21} = -\zeta^{-1} M$$

$$c_{22} = \zeta^{-1} L_s$$

$$0 = \begin{pmatrix} 0 & 0 \\ 0 & 0 \end{pmatrix}$$

$\omega_{r0}$: estimated rotational angular velocity of the induction motor
$k_{sp}$: rotation-angular-velocity defining proportional gain
$k_{si}$: rotation-angular-velocity defining integration gain
$R_{s0}$: estimated primary secondary resistance
$k_{r1p}$: primary-resistance defining gain
$k_{r1i}$: primary-resistance integration gain
$v_s$: primary voltage of the induction motor
$v_{as}$: a-axis component on the a-b axes plane (static coordinates) of the primary voltage of the induction motor
$v_{bs}$: b-axis component on the a-b axes plane (static coordinates) of the primary voltage of the induction motor
$\Phi_{s01}$: estimated primary magnetic flux of the induction motor
$\phi_{as1}$: a-axis component on the a-b axes plane (static coordinates) of the estimated primary magnetic flux of the induction motor
$\phi_{bs1}$: b-axis component on the a-b axes plane (static coordinates) of the second estimated primary magnetic flux of the induction motor
$\Phi_{s02}$: the second estimated primary magnetic flux of the induction motor
$\phi_{as2}$: a-axis component on the a-b axes plane (static coordinates) of the second estimated primary magnetic flux of the induction motor
$\phi_{bs2}$: b-axis component on the a-b axes plane (static coordinates) of the second estimated primary magnetic flux of the induction motor
$\Phi_{r02}$: the second estimated secondary magnetic flux of the induction motor
$\phi_{ar2}$: a-axis component on the a-b axes plane (static coordinates) of the second estimated secondary magnetic flux of the induction motor
$\phi_{br2}$: b-axis component on the a-b axes plane (static coordinates) of the second estimated secondary magnetic flux of the induction motor
$i_s$: primary current of the induction motor
$i_{as}$: a-axis component on the a-b axes plane (static coordinates) of the primary current of the induction motor
$i_{bs}$: b-axis component on the a-b axes plane (static coordinates) of the primary current of the induction motor
$i_{s01}$: first estimated primary current of the induction motor
$i_{as1}$: a-axis component on the a-b axes plane (static coordinates) of the first estimated primary current of the induction motor

[Formula 17]

$i_{bs1}$: b-axis component on the a-b axes plane (static coordinates) of the first estimated primary current of the induction motor
$i_{s02}$: estimated primary current of the induction motor
$i_{as2}$: a-axis component on the a-b axes plane (static coordinates) of the estimated primary current of the induction motor
$i_{bs2}$: b-axis component on the a-b axes plane (static coordinates) of the estimated primary current of the induction motor
E2: second state deviation
H1: first feedback gain
H2: second feedback gain
P1: solution of the equation (12)
P2: solution of the equation (13)
$L_s$: primary inductance of the induction motor
$L_r$: secondary inductance of the induction motor
M: mutual inductance of the induction motor
$\epsilon$: arbitrary positive number $$P_1 A^T + A P_1 - P_1 C^T R^{-1} C P + G_1 Q G_1^T = 0 \qquad (12)$$

$$G_1 = \begin{pmatrix} 0 & 0 \\ 0 & J \end{pmatrix} \quad Q_1 = \begin{pmatrix} I & 0 \\ 0 & I \end{pmatrix} \quad R = \epsilon I$$

$$P_2 A^T + A P_2 - P_2 C^T R^{-1} C P + G_2 Q G_2^T = 0 \qquad (13)$$

$$G_2 = \begin{pmatrix} \frac{a_{11}}{Z} I & \frac{a_{12}}{Z} I \\ 0 & 0 \end{pmatrix}$$

$$Z = \sqrt{a_{11}^2 + a_{12}^2}$$

Figure 2:
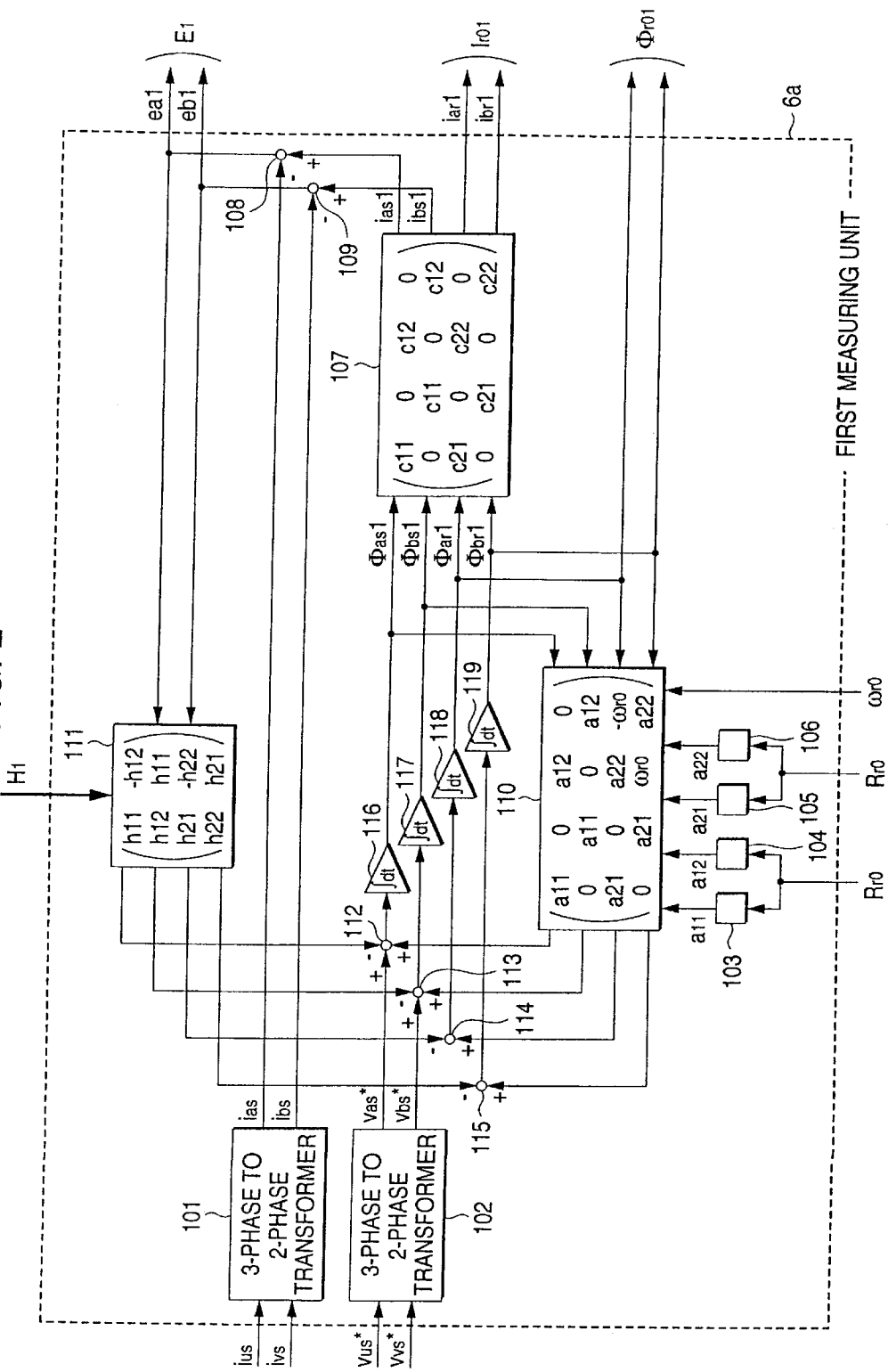
FIG. 2 is a block diagram showing the detail of a first measuring unit 6a used in the FIG. 1 control system.

FIG. 2 is a block diagram showing the detail of the first measuring unit 6a. In the figure, reference numeral 101 is a 3-phase to 2-phase transformer; 102 is another 3-phase to 2-phase transformer; 103 is an amplifier; 104 is an amplifier; 105 is an amplifier; 106 is an amplifier; 107 is a matrix computing unit; 108 is a subtractor; 109 is another subtractor; 110 is a matrix computing unit; 111 is a matrix computing unit; 112 to 115 are computing units; and 116 to 119 are integrators. The 3-phase to 2-phase transformer 101 coordinate-transforms the U- and V-phase components ius and ivs of a 3-phase current into a-axis and b-axis components ias and ibs on the a-b axis coordinates. The 3-phase to 2-phase transformer 102 coordinate-transforms the U- and V-phase components vus* and vvs* of the 3-phase voltage command into a-xis and b-axis components vas* and vbs* on the a-b axis coordinates. The amplifier 103 amplifies the estimated primary resistance Rs0 into Rs0·L/ξ and outputs the resultant as a11. The amplifier 104 amplifies the estimated primary resistance Rs0 into Rs0·M/ξ and outputs the resultant as a12. The amplifier 105 amplifies the estimated secondary resistance Rr0 into Rr0·M/ξ and outputs the resultant as a21. The amplifier 106 amplifies the estimated secondary resistance Rr0 into Rr0·−Ls/ξ and outputs the resultant as a22. The matrix computing unit 107 operates the equation (3) by use of a constant matrix C1. The subtractor 108 is used for subtraction of the a-axis components of a first state deviation E1. The subtractor 109 is used for subtraction of the b-axis components of the first state deviation E1. The matrix computing unit 110 operates the first term of the right side of the equation (2) by use of a matrix A consists of a11, a12, a21, a22, and ωr0. The matrix computing unit 111 operates the third term of the right side of the equation (2) by use of a matrix First feedback gain H1 consists of h11, h12, h21, h22. The computing or calculating units 112 to 115 perform addition and subtraction of the first, second and third terms of the right side of the equation (2). The integrators 116 to 119 integrate the right side of the equation (2) and produce øs0 and ør0.

a11, a12, a21 and a22 are equal to the result of multiplying Rs0 and Rr0 by constants, and can be obtained by inputting the estimated primary resistance Rs0 and the estimated secondary resistance Rr0 into the amplifiers 103 to 106.

The matrix computing unit 107 receives the estimated primary magnetic fluxes øas1 and øbs1 and the estimated secondary fluxes øar1 and øbr1, and operates the equation (3) (C1×those flux values).

The subtractor 108 subtracts the a-axis component ias, which is produced by the 3-phase-2-phase transformer, from he a-axis component ias1 of the first estimated primary current, and produces an a-axis component ea1 of the first state deviation E1.

Similarly, the subtractor 109 subtracts the b-axis component ibs, which is produced by the 3-phase to 2-phase transformer, from the b-axis component ibs1 of the first estimated primary current, and produces a b-axis component eb1 of the first state deviation E1.

Thus, the first state deviation E1 is produced from the subtractors 108 and 109.

The matrix computing unit 110 receives the estimated primary magnetic fluxes øas1 and øbs1 and the estimated secondary fluxes øar1 and øbr1, and operates the first term of the right side of the equation (2) (A×those flux values).

The matrix computing unit 111 receives state deviations ea1 and eb1, and operates the third term of the right side of the equation (2) (First feedback gain H1×those deviation values).

The calculating units 112 to 115 performs addition and subtraction of the first term of the right side of the equation 82) output from the matrix computing unit 110, the second term of the right side of the equation (2) output from the 3-phase to 2-phase transformer 102, and the third term of the right side of the equation (2) output from the matrix computing unit 111, and produce the left side of the equation (2), døas1/dt, døbs1/dt, and døar1/dt, døbr1/dt.

The integrator 116 integrates døas1/dt and produces øas1. Similarly, the integrators 117 to 119 integrate døbs1/dt, døar1/dt, and døbr1/dt, and produce øbs1, øar1, and øbr1.

The first measuring unit 6a thus constructed receives the estimated primary resistance Rs0, the estimated secondary resistance Rr0, the estimated rotation angular velocity ωr0, the first feedback gain First feedback gain H1, the primary voltage commands vus* and vvs*, and the primary currents ius and ivs, and operates the equations (2), (3) and (4), and outputs an estimated secondary current ir01 of the induction motor, and an estimated secondary magnetic flux ør0 and the first state deviation E1 of the induction motor.

Returning to FIG. 1, the first gain computing unit 7a operates the equation (5) by use of the estimated rotation angular velocity ωr0, which received from the rotational-speed estimating unit 8a, and outputs a first feedback gain First feedback gain H1.

Figure 3:
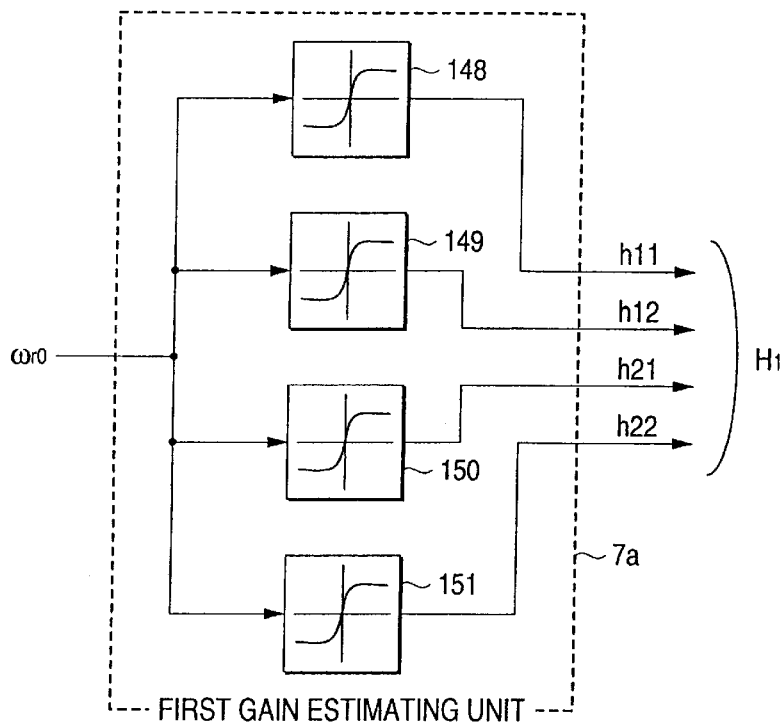
FIG. 3 is a block diagram showing an internal arrangement of a first gain computing unit 7a in the FIG. 1 control system.

FIG. 3 is a block diagram showing an internal arrangement of the first gain computing unit 7a. In the figure, numerals 148 to 151 designate gain tables. The equations (5) and (12) are solved in advance by use of motor constants. The first feedback gain H1 varies with the estimated rotation angular velocity ωr0. Those equations need to be solved for each rotation angular velocity.

The solutions obtained may be expressed by a matrix containing elements h11 and others (see the matrix computing unit 111 in FIG. 2).

The table 148 outputs the element h11 of the first feedback gain H1 for each estimated rotation angular velocity ωr0, on the basis of the solution. Similarly, the tables 149 to 151 outputs h12, h21 and h22 of the first feedback gain H1 for each estimated rotation angular velocity ωr0 on the basis of the solutions.

In this way, the first gain computing unit 7a outputs a first feedback gain H1 in accordance with the estimated rotation angular velocity ωr0 produced from the rotational-speed estimating unit 8a.

Returning to FIG. 1, the rotational-speed estimating unit 8a receives the estimated secondary magnetic flux ør01 and the first state deviation E1 from the first measuring unit 6a, and computes the outer product of ør01 and E1, and corrects the estimated rotation angular velocity ωr0 used in the first measuring unit 6a in accordance with the equation (6), and produces the resultant as an estimated rotation angular velocity ωr0.

Figure 4:
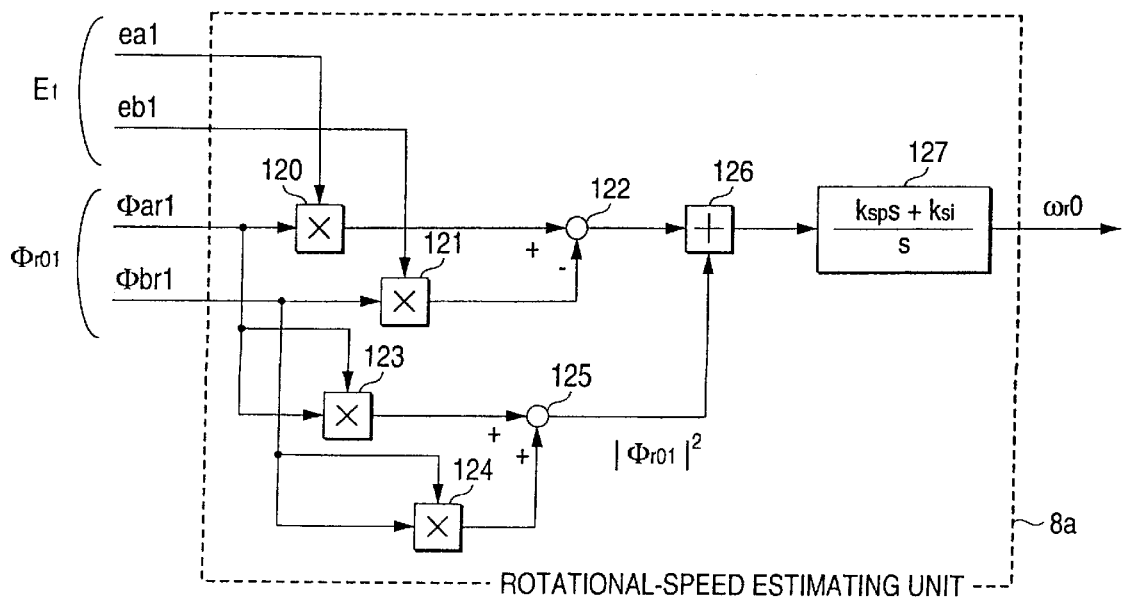
FIG. 4 is a block diagram showing an internal arrangement of a rotational-speed estimating unit 8a in the FIG. 1 control system.

FIG. 4 is a block diagram showing an internal arrangement of the rotational-speed estimating unit 8a.

The rotational-speed estimating unit 8a uses an equation (6A) in which the equation (6) is divided by $|ør01|^2$. Generally, the outer product of E1×ør01 is proportional to $|ør01|^2$. Use of the equation (6A) makes the gain of the rotational-speed estimating unit 8a independent of the secondary magnetic flux. The result is that the rotational-speed estimating operation has a fixed response and hence has a stable characteristic.

[Formula 18]

$$\omega_{r0} = \frac{k_{sp}s + k_{si}}{s} \frac{(J\Phi_{r01})^T E_1}{|\Phi_{r01}|^2} \quad (6A)$$

$$R_{s0} = -\frac{k_{rlp}s + k_{rli}}{s} \frac{i_{s02} \cdot E_2}{|i_{s02}|^2} \quad (11A)$$

In FIG. 4, numerals 120 and 121 are multipliers; 122 is a subtractor; 123 and 124 are multipliers; 125 is an adder; 126 is a divider; and 127 is a PI control unit.

The multipliers 120 and 121, and the subtractor 122 cooperate to operate $(Jør01)^T E1$, or (øar1×eb1−øbr1×ea1).

The multipliers 123 and 124 and the adder 125 cooperate to operate $|\phi r01|^2$, or $(\phi ar1 \times \phi ar1 + \phi br1 \times \phi br1)$.

The divider 126 operates $\{(J\phi r01)^T E1\} \div |\phi r01|^2$, and the PI control unit 127 produces the right side of the equation (6A), i.e., the estimated rotation angular velocity $\omega r0$.

Thus, the rotational-speed estimating unit 8a outputs an estimated rotation angular velocity $\omega r0$, which is based on the first state deviation E1 output from the first measuring unit 6a and the estimated secondary magnetic flux $\phi r01$.

Returning to FIG. 1, the secondary-resistance estimating unit 9a multiplies a component in phase with the estimated secondary magnetic flux r01 contained in the first state deviation E1, which is derived from the first measuring unit 6a, and another component in phase with the estimated secondary magnetic flux $\phi r01$ contained in the estimated secondary current ir01, corrects the estimated secondary resistance Rr0, which is used in the first measuring unit 6a, in accordance with the equation (1), on the basis of the product of those estimated secondary magnetic fluxes $\phi r01$, and outputs the corrected one.

[Formula 19]

$$R_{r0} = -\frac{k_{r2p}s + k_{r2i}}{s} \frac{(i_{r0l} \cdot \Phi_{r0l})(E_1 \cdot \Phi_{r0l})}{|\Phi_{r0l}|^2} \quad (1)$$

$$i_{r0l} = \begin{pmatrix} i_{arl} \\ i_{brl} \end{pmatrix}$$

$$\Phi_{r0l} = \begin{pmatrix} \phi_{arl} \\ \phi_{brl} \end{pmatrix}$$

where

Figure 5:
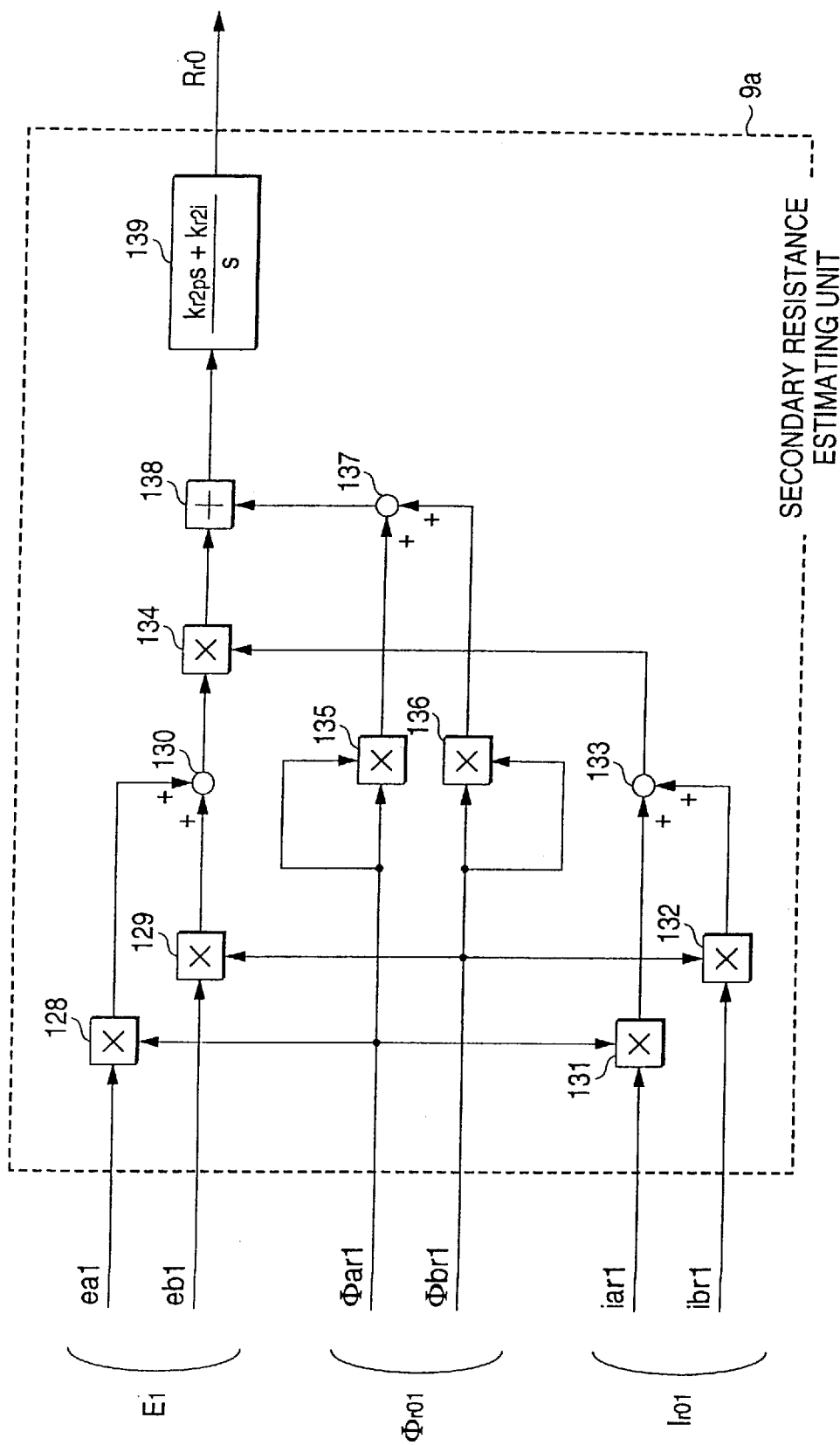
FIG. 5 is a block diagram showing an internal arrangement of a secondary-resistance estimating unit 9a in the FIG. 1 control system.

Rr0: estimated secondary resistance
s: Laplace operator
kr2p: secondary-resistance defining proportional gain
kr2: secondary-resistance defining integration gain
ir01: estimated secondary current of the induction motor
iar1: a-axis component of the estimated secondary current of the induction motor on the a-b axis coordinates
ibr1: b-axis component of the estimated secondary current of the induction motor on the a-b axis coordinates of the induction motor
Φr01: estimated secondary magnetic flux of the induction motor
Øar1: a-axis component of the estimated secondary magnetic flux of the induction motor on the a-b axis coordinates
Øbr1: b-axis component of the estimated secondary magnetic flux of the induction motor on the a-b axis coordinates
E1: first state deviation E1
•: operator indicative of the inner product of vectors FIG. 5 is a block diagram showing an internal arrangement of the secondary-resistance estimating unit 9a. In the figure, numerals 128 and 129 are multipliers; 130 is an adder; 131 and 132 are multipliers; 133 is an adder; 134 to 136 are multipliers; 137 is an adder; 138 is a divider; and 139 is a PI control unit.

The multipliers 128 and 129, and the adder 130 cooperate to operate $(E1 \cdot \phi r0)$, i.e., $(ea1 \times \phi ar1 + eb1 \times \phi br1)$. The multipliers 131 and 132, and the adder 133 cooperate to operate $(ir01 \cdot \phi r0)$, i.e., $(iar1 \times \phi ar1 + ibr1 \times \phi br1)$.

The multiplier 134 operates $(E1 \cdot \phi r0)(ir01 \cdot \phi r0)$.

The multipliers 135 and 136, and the adder 137 cooperate to operate $|\phi r01|^2$, or $(\phi ar1 \times \phi ar1 + \phi br1 \times \phi br1)$.

The divider 138 operates $((E1 \cdot \phi r0)(ir01 \cdot \phi r0)) \div |\phi r01|^2$, and the PUI control unit 139 produces the right side of the equation (1), i.e, the estimated secondary resistance Rr0.

The secondary-resistance estimating unit 9a processes the first state deviation E1, the estimated secondary magnetic flux $\phi r01$ and the estimated secondary current ir01, which are output from the first measuring unit 6a, and outputs an estimated secondary resistance Rr0.

In this way, the first parameter estimating means 5a produces an estimated rotation angular velocity $\omega r0$ and an estimated secondary resistance Rr0.

The second parameter estimating unit 5b will be described hereinafter. As shown in FIG. 1, the second parameter estimating unit 5b includes the second measuring unit 6b, the second gain computing unit 7b, and the primary-resistance estimating unit 10b. The second parameter estimating unit 5b receives the primary voltage commands vus* and vvs* from the torque control means 3, the primary currents ius and ivs from the current detecting means 4, and the estimated rotation angular velocity $\omega r0$ and the estimated secondary resistance Rr0 from the first parameter estimating means 5a, and outputs an estimated primary resistance Rs0.

The second measuring unit 6b receives the primary voltage commands vus* and vvs*, the primary currents ius and ivs, and the estimated rotation angular velocity $\omega r0$ and the estimated secondary resistance Rr0, which are derived from the first parameter estimating means 5a, a second feedback gain second state deviation H2 from the second gain computing unit 7b, and the estimated primary resistance Rs0 from the primary-resistance estimating unit 10b, and processes those signals by use of the equations (7) to (9), and produces an estimated primary current is0 and a second state deviation E2.

Figure 6:
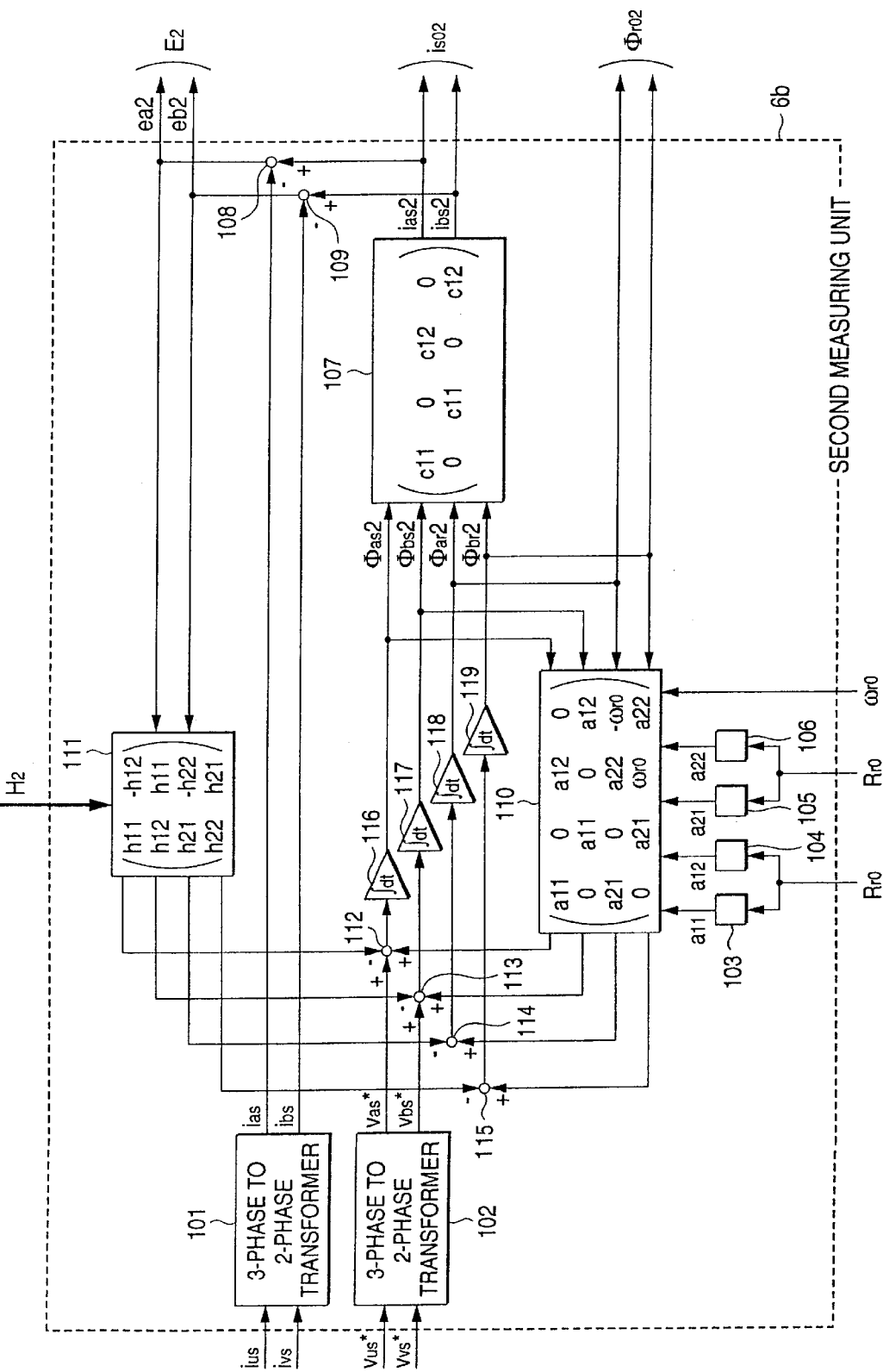
FIG. 6 is a block diagram showing an internal arrangement of a second measuring unit 6b in the FIG. 1 control system.

FIG. 6 is a block diagram showing an internal arrangement of the second measuring unit 6b. The input and output signals to and from the second measuring unit 6b are different from those to and from the first measuring unit 6a, but the arrangements of them are substantially equal to each other, and hence no further description of the second measuring unit 6b will be given here.

The second gain computing unit 7b receives the estimated rotation angular velocity $\omega r0$ from the first parameter estimating means 5a, processes it by use of the equation (10), and produces a second feedback gain second state deviation H2. There is no need that a positive number $\epsilon$ handled in the first gain computing unit 7a is equal to that handled in the second gain computing unit 7b.

The primary-resistance estimating unit 10b receives the estimated primary current is02 and the second state deviation E2 from the second measuring unit 6b, and computes the inner product of them, is02·E2, and corrects the estimated primary resistance Rs0 used in the second measuring unit 6b by use of the equation (11).

Figure 7:
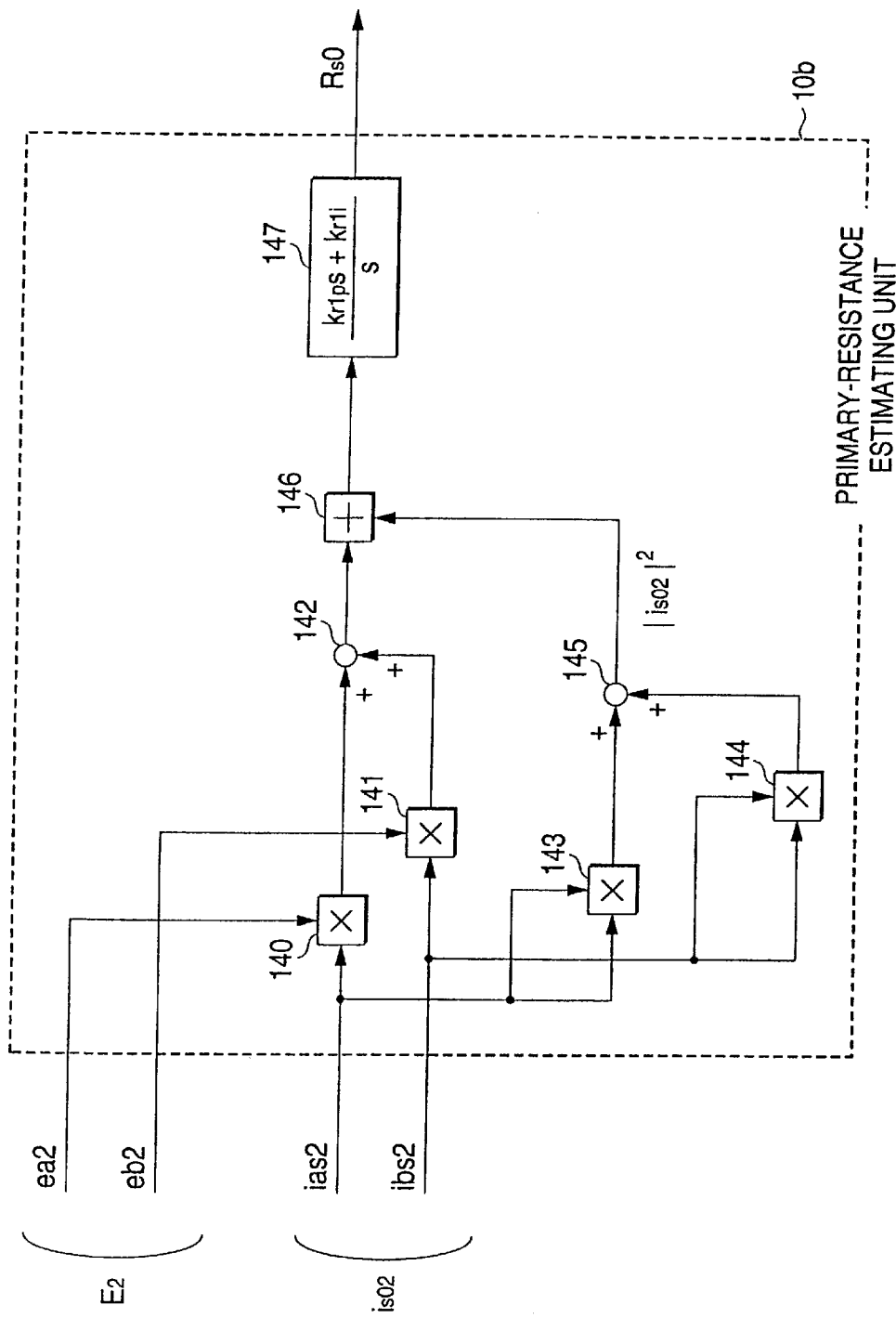
FIG. 7 is a block diagram showing an internal arrangement of a primary-resistance estimating unit 10b in the FIG. 1 control system.

FIG. 7 is a block diagram showing an internal arrangement of the primary-resistance estimating unit 10b.

The primary-resistance estimating unit 10b uses an equation (11A) in which the equation (11) is divided by $|is02|^2$ (square of the estimated primary current is02). Generally, the inner product of the second state deviation E2 and the estimated primary current is02 is proportional to $|is|^2$ (square of the primary current "is"). Therefore, use of the equation (11A) makes the gain of the primary-resistance estimating unit 10b constant irrespective of the primary current value. Accordingly, the estimating operation by the primary-resistance estimating unit 10b is fixed in response and is always stable in characteristic.

In FIG. 7, 140 and 141 are multipliers; 142 is an adder; 143 and 144 are multipliers; 145 is an adder; 146 is a divider; and 147 is a PI control unit.

The multipliers 140 and 141, and the adder 142 cooperate to operate (is02·E2), i.e., (ias2×ea2+ibs2×eb2). The multipliers 143 and 144, and the adder 145 cooperate to operate $|is02|^2$, i.e., (ias2×ias2+ibs2×ibs2).

The divider 146 operates $(is02 \cdot E2) \div |is02|^2$, and the PI control unit 147 produces the right side of the equation (1A), or the estimated primary resistance Rs0.

The primary-resistance estimating unit 10*b* processes the second state deviation E2 and the estimated primary current is02, and produces an estimated primary resistance Rs0.

In this way, the second parameter estimating unit 5*b* produces an estimated primary resistance estimated primary resistance Rs0.

An operation of the induction-motor control system thus arranged will be described.

Figure 20A:
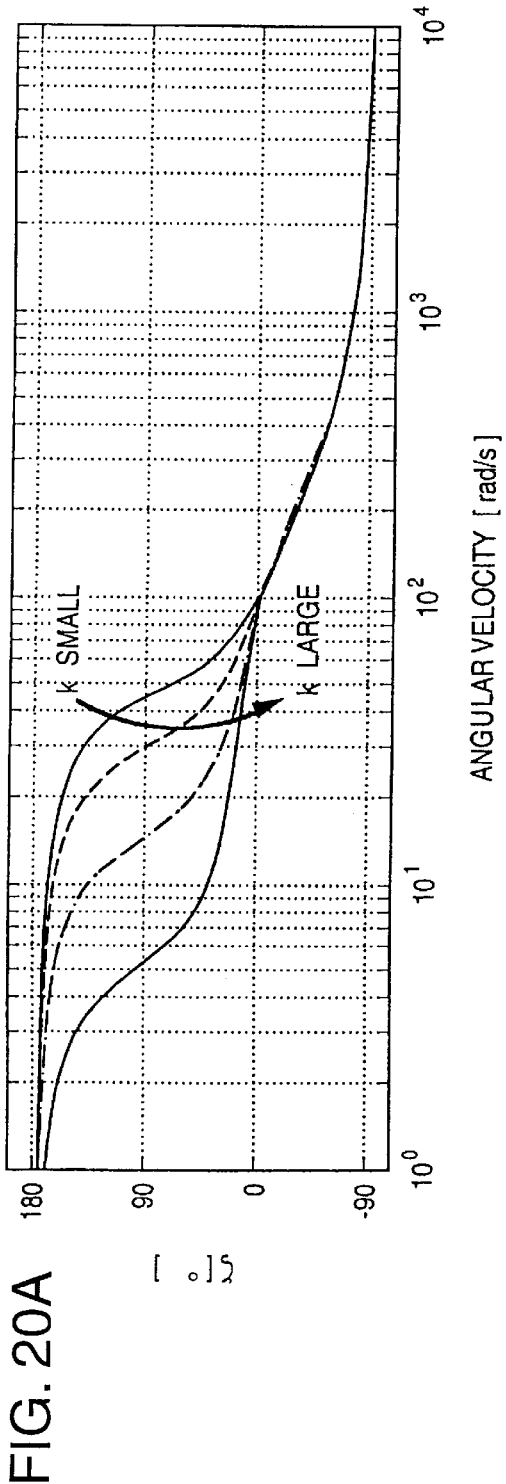
FIG. 20A is a graph showing an exemplary relationship between the phase difference ξ and the primary angular velocity ω, which are derived from the conventional parameter estimating means 5 (rotation angular velocity ωr=100 (rad/s), and FIG. 20B is a graphical representation of an exemplary relationship between the phase difference ξ and the primary angular velocity ω(ωr (rotation angular velocity)=100 rad/s), which are derived from the first parameter estimating means 5a of the present invention.
Figure 20B:
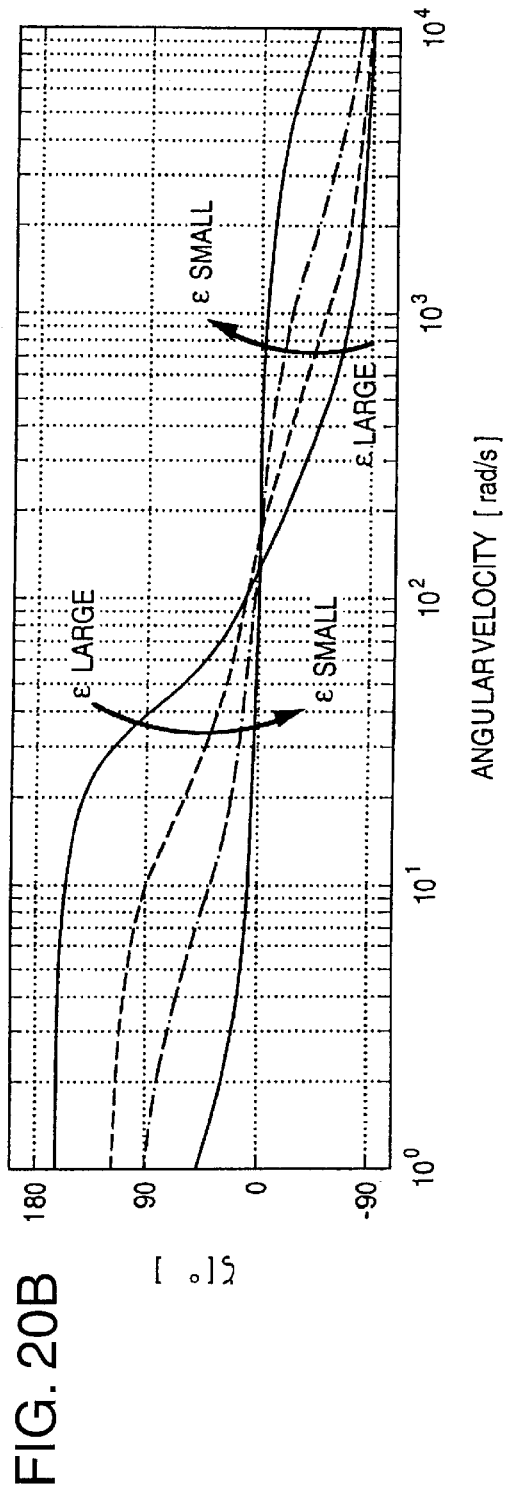
Figure 21:
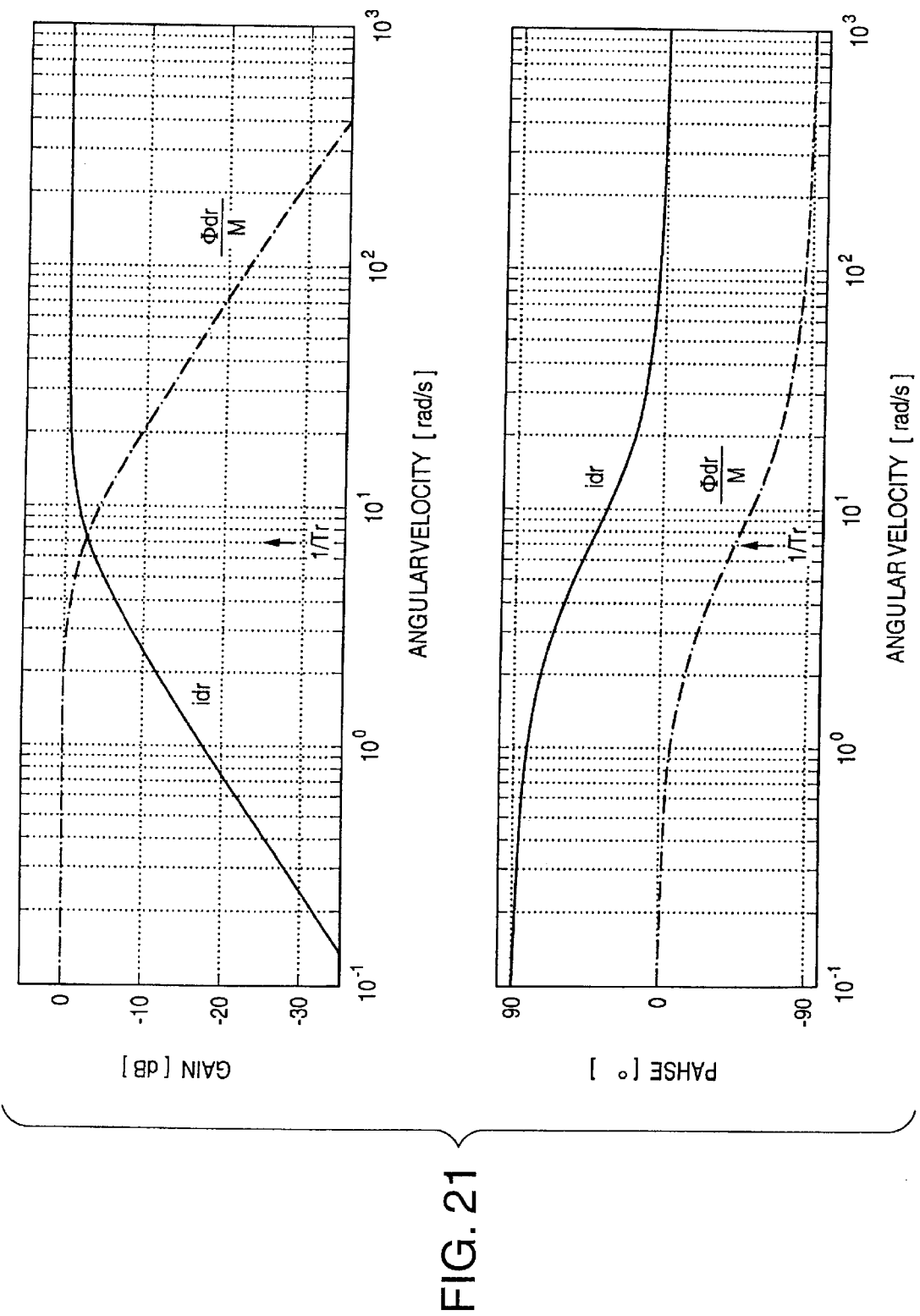
FIG. 21 is a graph showing a transfer characteristic from the excitation current ids to (ø dr/M) and idr.

FIG. 20B, already referred to, is a graphical representation of an exemplary relationship between the phase difference ξ and the primary angular velocity ω (ωr (rotation angular velocity)=100 rad/s), which are derived from the first parameter estimating means 5*a*.

In the graph, the abscissa represents the angular velocity of ir0 (i.e., primary angular velocity ω), and the ordinate represents the phase difference ξ between ir0 and E1.

In FIG. 20B, ε is a parameter used in the first gain computing unit 7*a*. As seen, the characteristic profile varies depending on the value of the parameter ε, and as the parameter ε is reduced, the characteristic approaches in profile to a desired one (the phase difference ξ≑0°). This fact implies that the estimating operation for the estimated secondary resistance is well performed irrespective of the frequency bands.

The first gain computing unit 7*a* outputs the first feedback gain H1 so that when a difference is present between the rotation angular velocity ωr of the induction motor and the estimated rotation angular velocity ωr0, a component orthogonal to the estimated secondary magnetic flux contained in the first state deviation E1 is produced (viz., ξ≑0°).

Figure 8:
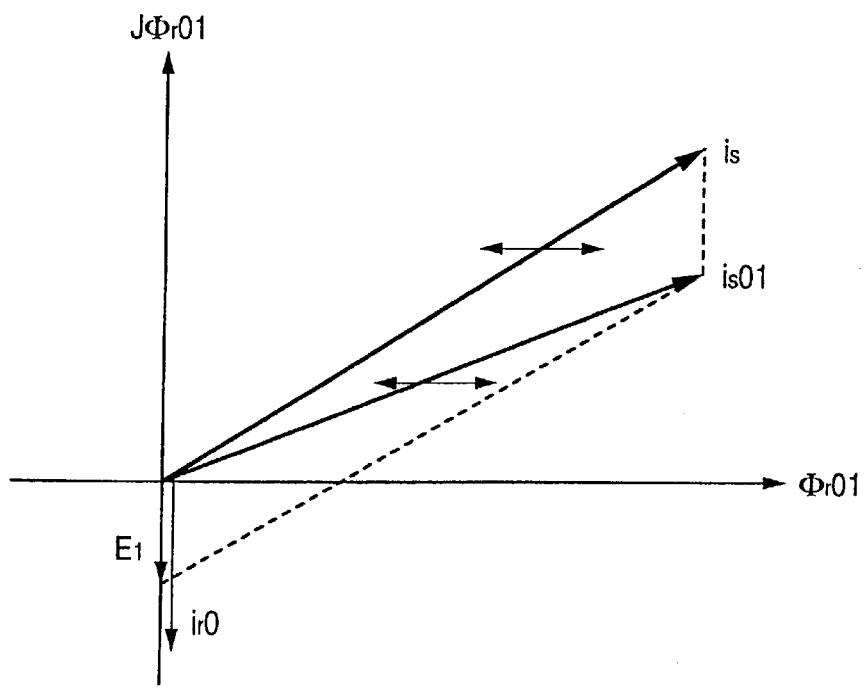

The operation thus far made may be depicted on the d-q axes plane as shown in FIG. 8. When the first feedback gain H1, which is obtained by the equation (5), is used, the first state deviation E1 is expressed as a vector in phase with the component orthogonal to the estimated secondary magnetic flux φr0, i.e., Jφr01. The estimated secondary current ir01 is also in phase with the first state deviation E1 as shown. Accordingly, the phase difference ξ between ir0 and E1 is almost zero.

When an AC signal is superposed on the excitation current, the tips of the respective vectors oscillate at given amplitudes and in a direction parallel to the d-axis.

In this way, the control system of the embodiment 1 successfully overcomes the problem 2) discussed.

A solution of the embodiment 1 to the problem 5)) already referred to will be described. The estimation process of the rotational speed is similar to the conventional one (equation (6) or (6A)). Accordingly, the estimating process uses the component orthogonal to the estimated secondary magnetic flux φr01 as already described. The process to estimate the secondary resistance uses the equation (1), and hence it is an estimating process using the component (ir0·φr01) (E1·φr01), which is in phase with the estimated secondary magnetic flux φr01. Therefore, a process of estimating the rotational angular velocity and the secondary resistance separately is possible. In this respect, the solution of the embodiment 1 to the problem 5) is correct.

Figure 19A:
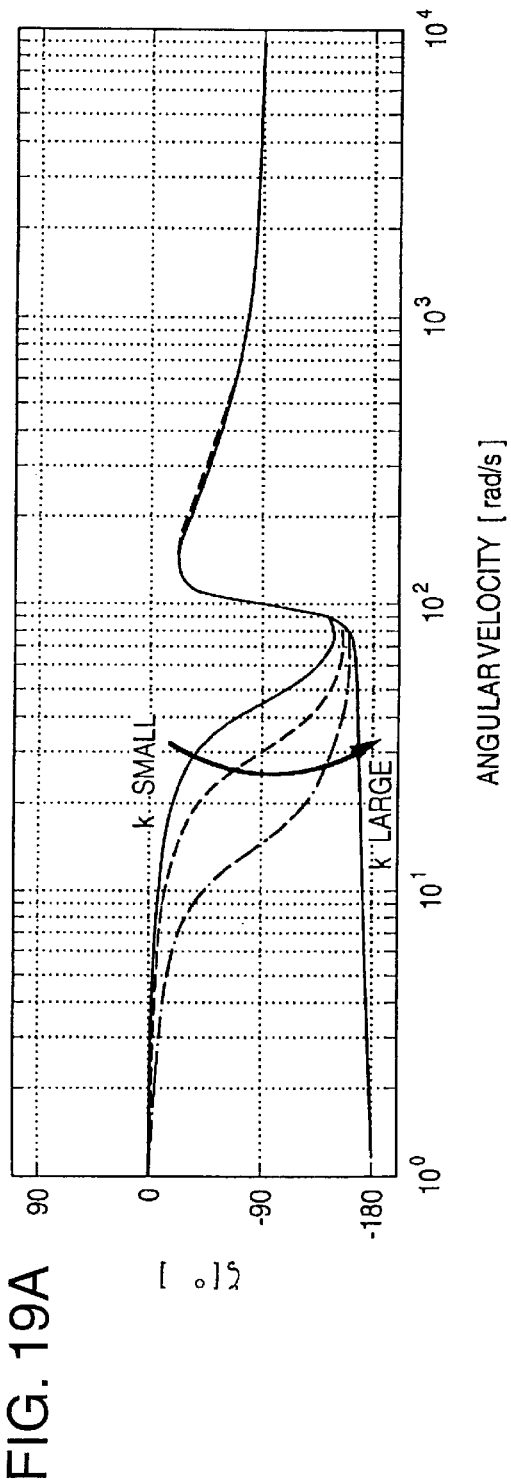
FIG. 19A is a graph showing an exemplary relationship between the phase difference ξ and the primary angular velocity ω, which is derived from the conventional parameter estimating means 5 (rotation angular velocity ωr is 100 (rad/s))
Figure 19B:
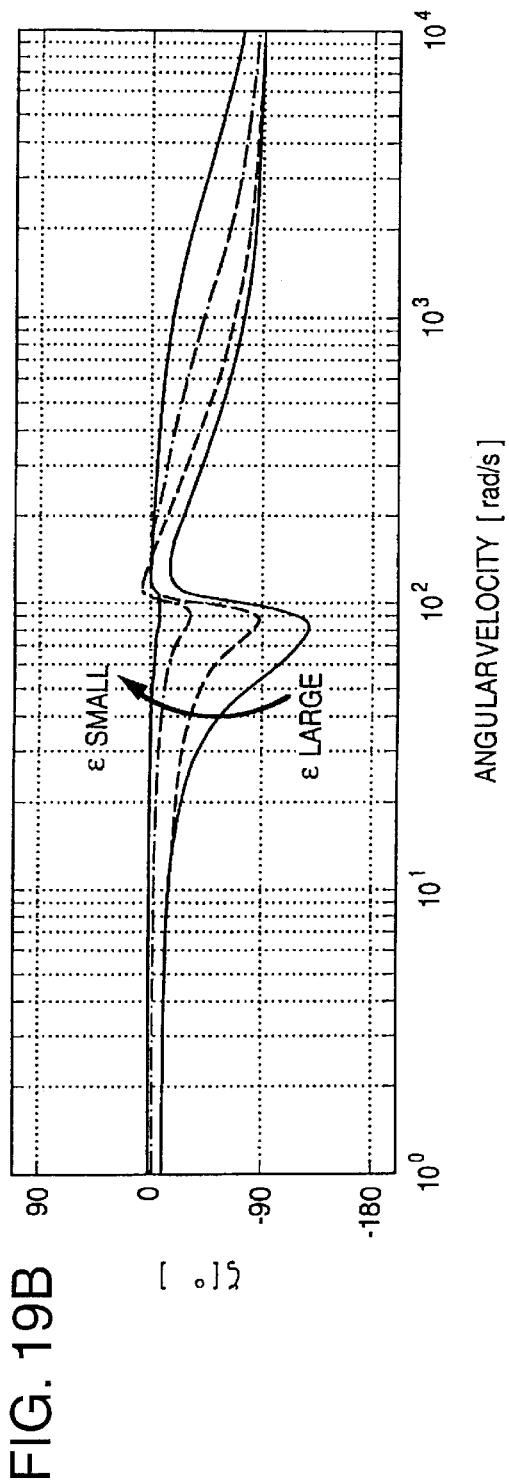
FIG. 19B is a graph showing an exemplary relationship between the phase difference ξ and the primary angular velocity ω, which is derived from the second parameter estimating unit 5b of the present invention (rotation angular velocity ωr is 100 (rad/s)).

FIG. 19B is a graph showing an exemplary relationship between the phase difference and the primary angular velocity ω, which is derived from the second parameter estimating unit 5*b* (rotation angular velocity ωr is 100 (rad/s)). In the graph, the abscissa represents an angular velocity (i.e., primary angular velocity ω) of the estimated primary current is01, and the ordinate represents the phase difference ξ between the is01 and E2.

In the graph, ε indicates a parameter used in the second gain computing unit 7*b*. A profile of the characteristic (in its graphical representation) varies depending on the value of the parameter ε. Decreasing the parameter ε makes the characteristic approach to a desired one (ξ≑0°), as seen.

In the embodiment 1, the second gain computing unit 7*b* produces a second feedback gain H2 so that when a difference is present the primary resistance Rs of the induction motor 2 and the estimated primary resistance Estimated primary resistance Rs0, a component in phase with the estimated primary current is produced (ξ≑0°).

Figure 9:
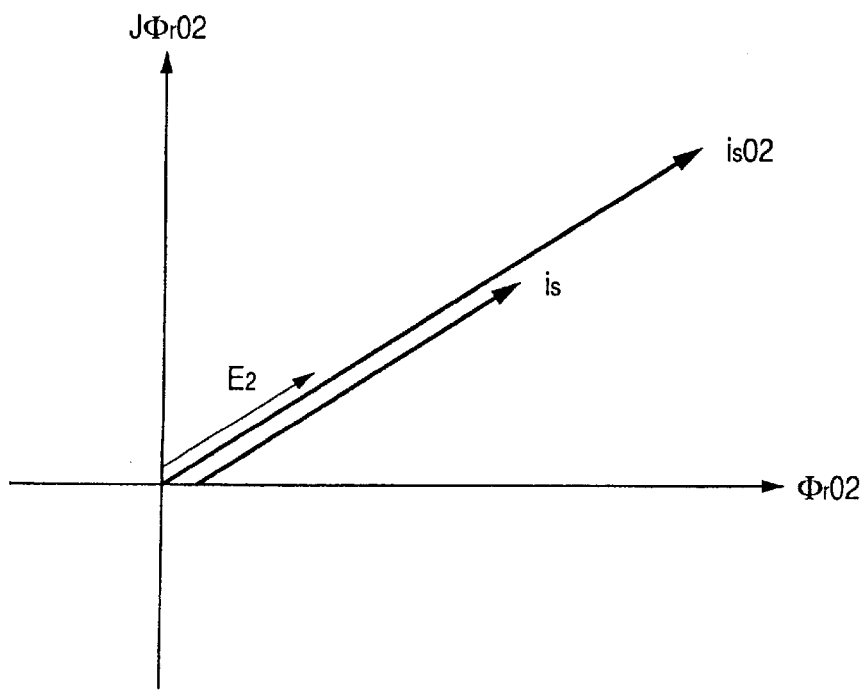
FIG. 9 is a vector diagram showing an operation of the second gain computing unit 7b.

The above operation of the control system may be depicted on the d-q axes plane as shown in FIG. 9.

Specifically, where the second state deviation H2 obtained by the equation (10) is used, the second state deviation E2 takes a vector in phase with the estimated primary current is02. As a result, ξ≑0° is realized.

Consequently, the estimating operation of the primary resistance is allowed not only in the regenerative region but also over a broad frequency region, and hence the solution of the embodiment 1 to the problem 1) is corrected.

Meanwhile, in determining the feedback gain G in the conventional gain computing unit 7, the designer puts his attention on only such a pole arrangement that the number of poles of the measuring unit is k times as large as that of the induction motor 2. Accordingly, the primary and secondary resistance are estimated on the basis of one feedback gain G. As a result, the conventional control system cannot produce the characteristic of the state deviation E which can satisfy all the items to be estimated.

On the other hand, the embodiment 1 includes the first gain computing unit 7*a* for estimating the secondary resistance and the rotation angular velocity, and the second gain computing unit 7*b* for estimating the primary resistance. The first and second feedback gains H1 and H2 of those units are separately set. The former is controlled such that the first state deviation E1 is in phase with the estimated secondary magnetic flux quadrature component Jφr0 (viz., ξ≑0°). The latter is controlled such that the second gain computing unit 7*b* produces a second feedback gain H2 so that a component in phase with the estimated primary current is produced (ξ≑0°). Therefore, the embodiment 1 is capable of reliably estimating all the primary and secondary resistance and the rotation angular velo In the embodiment 1, the secondary-resistance estimating unit 9*a* estimates the estimated secondary resistance Rr0 on the basis of the first state deviation H1, the estimated secondary magnetic flux φr01, and the estimated secondary current ir01. Where a level of the requirement for the separation of it from the rotational angular velocity is somewhat lowered, the estimated secondary resistance Rr0 may be estimated on the basis of the first feedback gain H1 and the estimated secondary current ir01. Also in this case, the first and second gain computing units 7*a* and 7*b* are included. Therefore, the estimating operations for the secondary resistance, the rotation angular velocity and the primary resistance can be performed in the best conditions as mentioned above.

<Embodiment 2>

Figure 10:
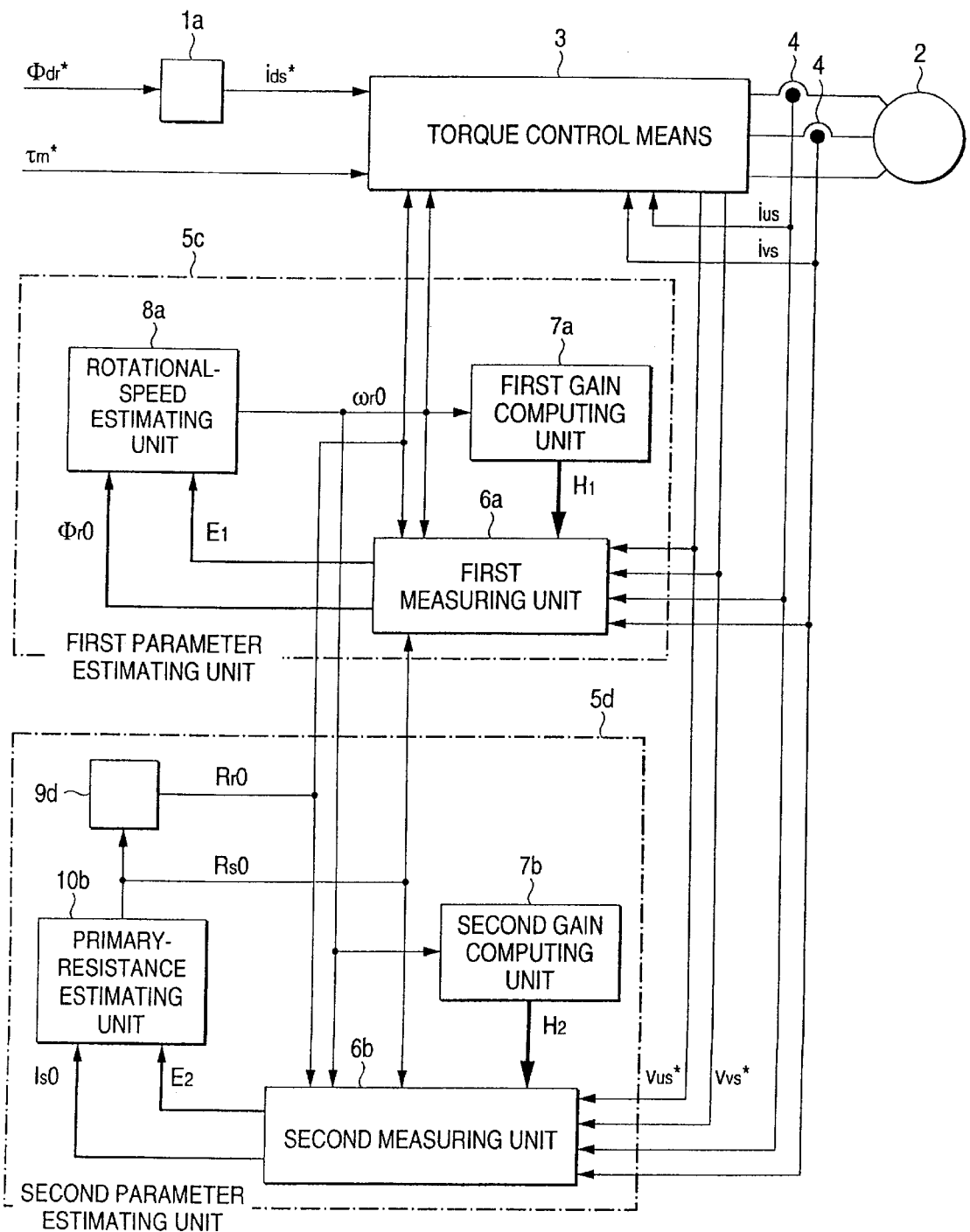
FIG. 10 is a block diagram showing an arrangement of a control system for an induction motor, which is an embodiment 2 of the present invention.

FIG. 10 is a block diagram showing a control system for an induction motor, which is an embodiment 2 of the present invention. In the figure, reference numerals 2 to 4, 6*a*, 6*b*, 7*a*, 7*b*, 8*a*, and 10*b* designate like portions in the embodiment 1, and hence the detailed description of them will be omitted in the description of the embodiment 2.

In FIG. 10, reference numeral 1a is excitation-current command computing means; 5c is first parameter estimating means; 5d is second parameter estimating means; and 9d is a secondary resistance estimating unit.

The excitation-current command computing means 1a receives a secondary magnetic-flux command ødr*, divides it by M, and produces the resultant as ids*.

The first parameter estimating means 5c includes a first measuring unit 6a, a first gain computing unit 7a, and a rotational-speed estimating unit 8a. The first parameter estimating means 5c receives the primary voltage commands vus* and vvs* from the torque control means 3, the primary currents ius and ivs from the current detecting means 4, the estimated primary resistance Rs0 and the estimated secondary resistance Rr0 from the second parameter estimating means 5d, and outputs an estimated rotation angular velocity ωr0.

The second parameter estimating means 5d includes a second measuring unit 6b, a second gain computing unit 7b, the secondary resistance estimating unit 9d, and a primary-resistance estimating unit 10b. The second parameter estimating means 5d receives the primary voltage commands vus* and vvs* from the torque control means 3, the primary currents ius and ivs from the current detecting means 4, and the estimated rotation angular velocity ωr0 from the first parameter estimating means 5c, and outputs an estimated primary resistance Rs0 and an estimated secondary resistance Rr0.

A major cause of a variation of electric resistance is temperature variation. Assuming that temperature of the primary resistance of the induction motor is substantially equal to that of secondary resistance, the estimated primary resistance Rs0 may be made to be proportional to the estimated secondary resistance Rr0.

For this reason, in the embodiment 2, the secondary resistance estimating unit 9d is arranged such that it outputs an estimated secondary resistance Rr0 proportional to an estimated primary resistance Rs0 input thereto.

In the embodiment 2, the first feedback gain H1 from the first gain computing unit 7a sets up the condition of ξ (phase difference)≐0°, the rotation angular velocity ωr can be estimated highly accurately. Use of the second gain computing unit 7b which computes the second state deviation H2 provides such a characteristic as to satisfy the condition of ξ≠0°. Therefore, the estimated primary resistance Rs0 can be obtained in a region of regeneration. Hence, the estimated secondary resistance Rr0 is also obtained in the same region.

With such a unique arrangement, the estimated primary resistance Rs0, the estimated secondary resistance Rr0, and the estimated rotation angular velocity ωr0 are highly accurately produced from the first parameter estimating means 5c and the second parameter estimating means 5d. Therefore, the torque control means 3 can perform such a control that the output torque τm accurately follows the torque command τm*.

<Embodiment 3>

Figure 11:
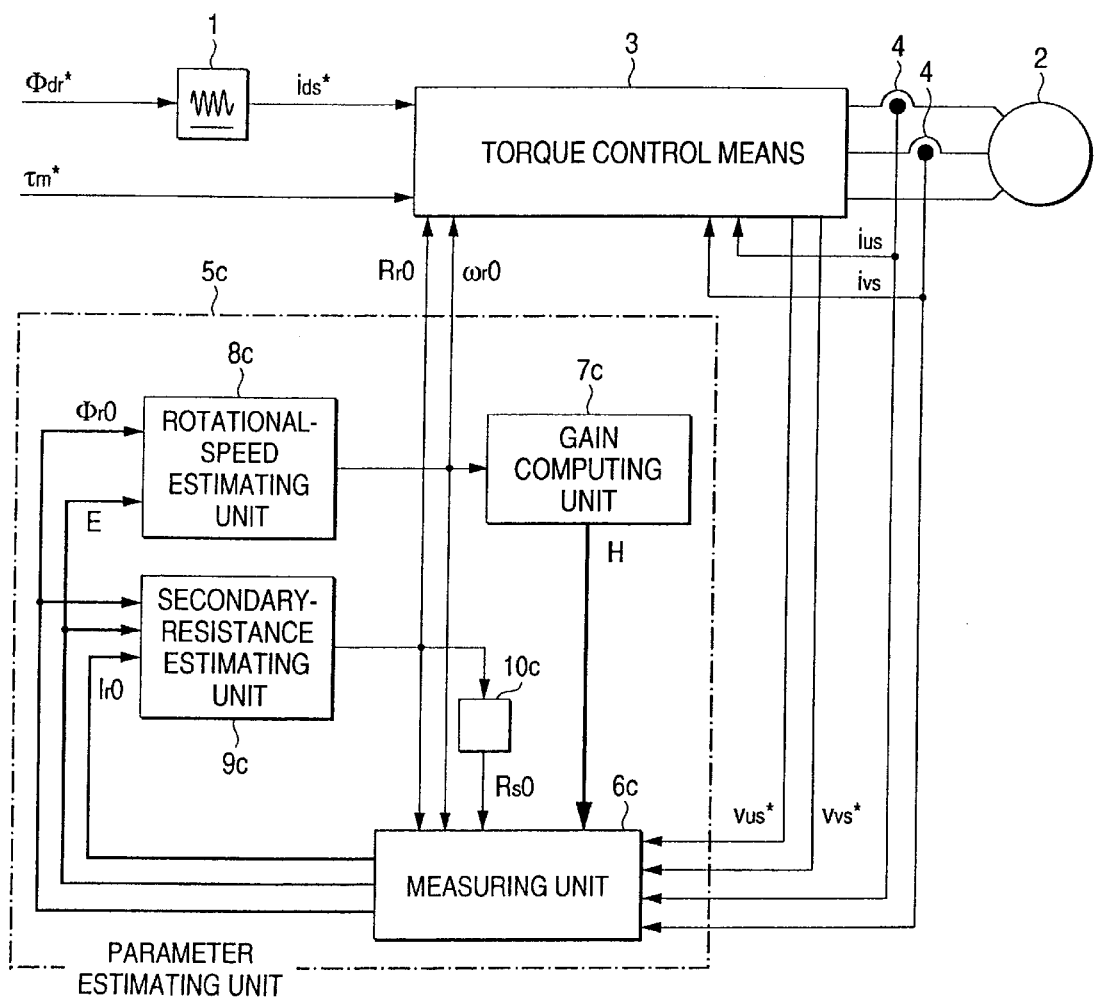
FIG. 11 is a block diagram showing an arrangement of a control system for an induction motor, which is an embodiment 3 of the present invention.

FIG. 11 is a block diagram showing a control system for an induction motor, which is an embodiment 3 of the present invention. In the figure, reference numerals 1 to 4 designate like portions in the conventional one, and hence the detailed description of them will be omitted in the description of the embodiment 3. In FIG. 11, reference numeral 5e is parameter estimating means; 6e is a measuring unit; 7e is a gain computing unit; 8e is a rotational speed estimating unit; 9e is a secondary resistance estimating unit; and 10e is a primary resistance estimating unit.

The parameter estimating means 5e includes the measuring unit 6e, the gain computing unit 7e, the rotational speed estimating unit 8e, the second resistance estimating unit 9e, and the primary resistance estimating unit 10e. The parameter estimating means 5e receives the primary voltage commands vus* and vvs* from the torque control means 3, and the primary currents ius and ivs from the current detecting means 4, and outputs an estimated rotation angular velocity ωr0 and an estimated secondary resistance Rr0.

The measuring unit 6e receives the primary voltage commands vus* and vvs*, the primary currents ius and ivs, and the feedback gain H from the gain computing unit 7e, the estimated rotation angular velocity ωr0 from the rotational speed estimating unit 8e, the estimated secondary resistance Rr0 from the secondary resistance estimating unit 9e, and the estimated primary resistance Rs0 from the primary resistance estimating unit 10e; performs an operation similar to that by the first measuring unit 6a in the embodiment 1; and outputs an estimated secondary current estimated secondary current ir0, a state deviation E (equation (16)), and an estimated secondary magnetic flux ør0, instead of the estimated secondary current Ir01, the first state deviation E1, and the estimated secondary magnetic flux ør01.

[Formula 20]

$$\frac{d}{dt}\begin{pmatrix}\Phi_{s01}\\ \Phi_{r01}\end{pmatrix}=A\begin{pmatrix}\Phi_{s01}\\ \Phi_{r01}\end{pmatrix}+Bv_s-HE \tag{14}$$

$$\begin{pmatrix}i_{s02}\\ i_{r01}\end{pmatrix}=C_1\begin{pmatrix}\Phi_{s01}\\ \Phi_{r01}\end{pmatrix} \tag{15}$$

$$E=i_{s02}-i_s \tag{16}$$

$$H=P_1C^TR^{-1} \tag{17}$$

$$\omega_{r0}=\frac{k_{sp}s+k_{si}}{s}\frac{(J\Phi_{r01})^TE}{|\Phi_{r01}|^2} \tag{18}$$

$$R_{r0}=-\frac{k_{r2p}s+k_{r2i}}{s}\frac{(i_{r01}\cdot\Phi_{r01})(E\cdot\Phi_{r01})}{|\Phi_{r01}|^2} \tag{19}$$

where

E: state deviation

H: feedback gain

Figure 12:
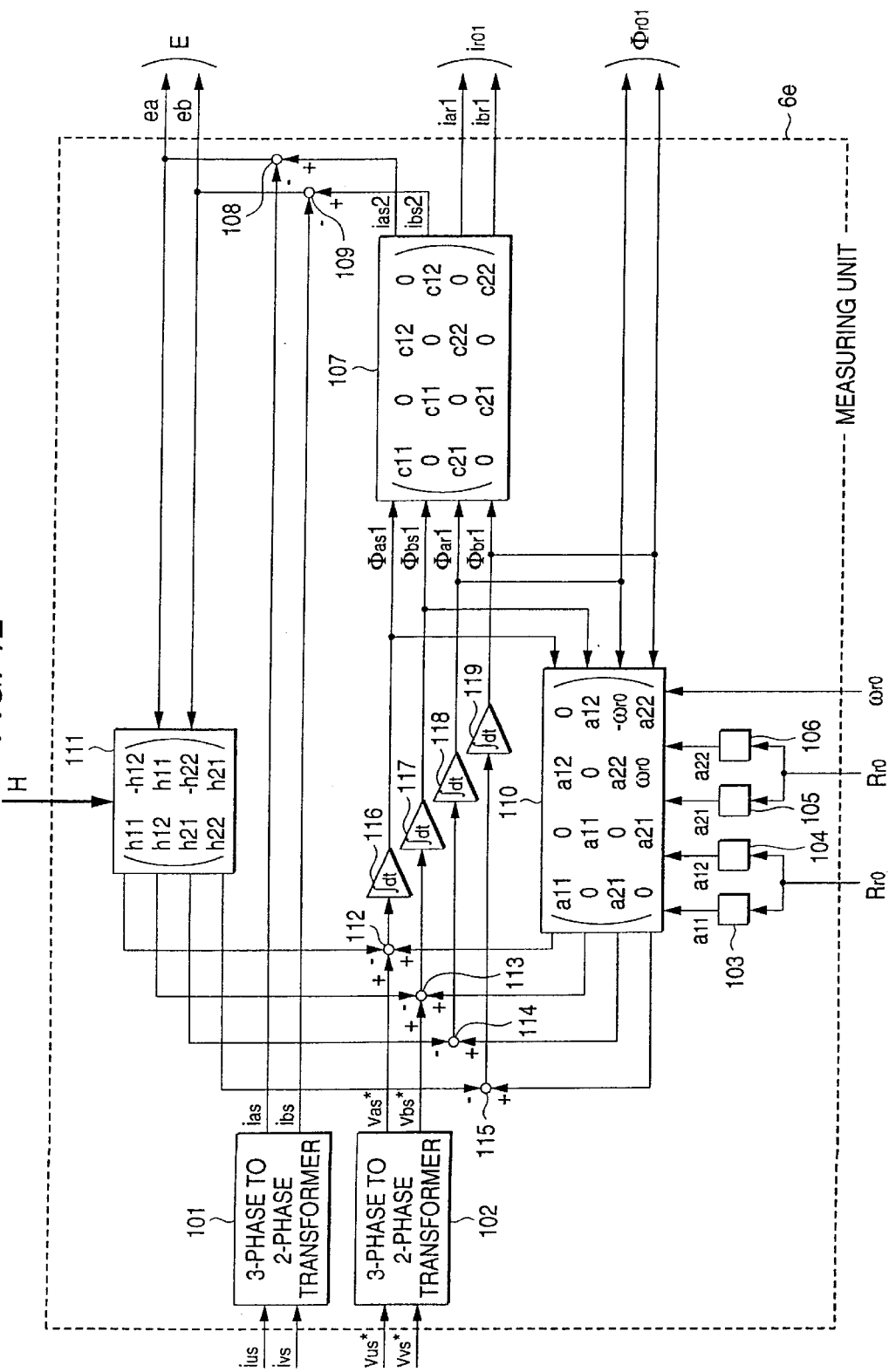
FIG. 12 is a block diagram showing an internal arrangement of a measuring unit 6e in the FIG. 11 control system.

FIG. 12 is a block diagram showing an internal arrangement of the measuring unit 6e. The arrangement of the measuring unit 6e is substantially the same as of the first measuring unit 6a already described. Therefore, description of the details of the measuring unit 6e will be omitted.

Returning to FIG. 1, the gain computing unit 7e performs an operation similar to that by the first gain computing unit 7a in the embodiment 1, by use of an estimated rotation angular velocity ωr0 received from the rotational speed estimating unit 8e, and outputs a feedback gain H (equation (17)), instead of the first feedback gain H1.

The rotational speed estimating unit 8e receives an estimated secondary magnetic flux Φr0 and a state deviation E from the measuring unit 6e, and computes an outer product of Exør0; performs an operation similar to that by the rotational-speed estimating unit 8a in the embodiment 1; and outputs an estimated rotation angular velocity ωr0 (equation (18)).

The secondary resistance estimating unit 9e corrects the estimated secondary resistance Rr0 used in the measuring unit 6e by executing an operation similar to that by the secondary-resistance estimating unit 9a in the embodiment 1, on the basis of the product of a component, which is in phase with the estimated secondary magnetic flux ødr0 contained in the state deviation E derived from the measuring unit 6e, and another component, which is in phase with estimated secondary magnetic flux ør0 contained in the estimated secondary current estimated secondary current estimated secondary current Ir0 (equation (19)).

A major cause of a variation of electric resistance is temperature variation. Assuming that temperature of the primary resistance of the induction motor is substantially equal to that of secondary resistance, the estimated primary resistance Rs0 may be made to be proportional to the estimated secondary resistance Rr0.

The primary resistance estimating unit 10e outputs a quantity proportional to the input estimated secondary resistance Rr0 as an estimated primary resistance Rs0.

In the embodiment 3, use of the gain computing unit 7e for computing the feedback gain H provides such a characteristic as to satisfy the condition $\xi \doteq 0°$, and hence this embodiment is capable of estimating an estimated secondary resistance Rr0 highly accurately. Therefore, it produces a highly accurate estimated secondary resistance estimated secondary resistance Rr0.

Thus, the estimated primary resistance Rs0, the estimated secondary resistance Rr0, and the estimated rotation angular velocity ωr0 are highly accurately produced from the parameter estimating means 5e. Therefore, the torque control means 3 can perform such a control that the output torque τm accurately follows the torque command τm*.

<Embodiment 4>

In the excitation-current command computing means 1, the AC signal to be superposed on the excitation current command excitation current ids* contains frequency components sufficiently shorter in period than 1/Tr (reciprocal of the secondary time constant).

Figure 18A:
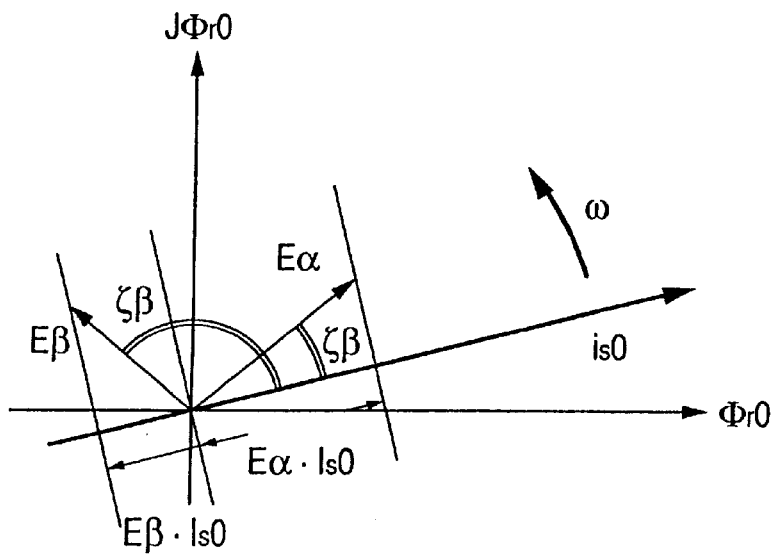
FIG. 18A is a vector diagram showing a relationship between the estimated primary current Is0 and the state deviation E when a difference (error) is present between the primary resistance Rs and the estimated primary resistance Rs0 of the induction motor.
Figure 18B:
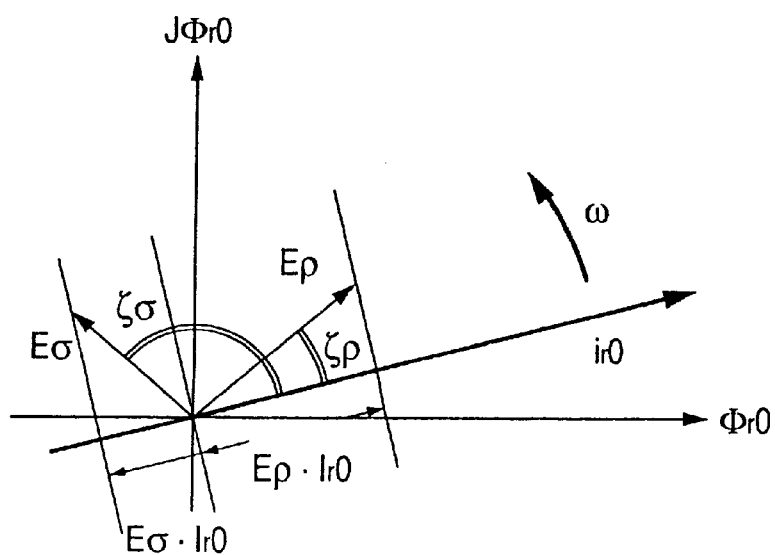
FIG. 18B is a vector diagram showing a relationship between the estimated secondary current ir0 and the state deviation E when a difference (error) is present between the secondary resistance Rr and the estimated secondary resistance Rr0.

As seen from the transfer characteristic diagram from the excitation current ids to (ødr/M) and idr shown in FIG. 18 and already referred to, if an AC signal not containing frequency components much shorter in period than 1/Tr (reciprocal of the secondary time constant) is superposed on the DC signal, which is proportional to the secondary magnetic flux ødr*, those frequency components are not contained in the secondary magnetic-flux amplitude ødr.

Excitation-current command computing means 1b (not shown) may be used in place of the excitation-current command computing means 1 and 1a in the embodiments 1 to 3.

In this case, the excitation-current command computing means 1b must be such that the frequencies f1 and f2 of the first and second superposing signals in the equation (20) defining the excitation current command excitation current ids* must be defined by the following equations (31) and (32).

[Formula 21]

$$f1 > 1/Tr$$

$$f2 > 1/Tr$$

Where the excitation-current command computing means 1b is used, anAC signal superposed to the DC signal does not contain the period longer than the secondary time constant of the induction motor 2. Therefore, the secondary magnetic-flux amplitude ødr of the induction motor 2 does not contain frequency components.

As a result, it is possible to keep the secondary magnetic-flux amplitude ødr of the induction motor 2 constant. If so done, there is no chance that the mutual inductance M varies in value by magnetic saturation, for example. Therefore, the torque control means 3 performs such a control that the output torque τm accurately follows the torque command τm*.

Therefore, the problem 3) can be solved successfully.

<Embodiment 5>

In the excitation-current command computing means 1 (1b) of the above-mentioned embodiments, the AC signal contains only two frequency components f1 and f2. It is desirable that the number of the frequency components contained in the AC signal is large.

Figure 15:
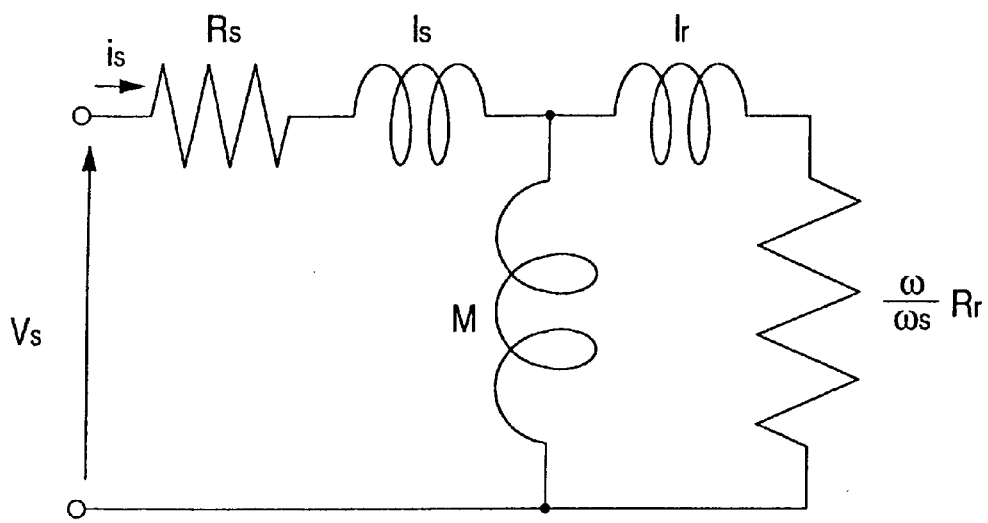
FIG. 15 is a diagram showing a T-type equivalent circuit of an induction motor.
Figure 16:
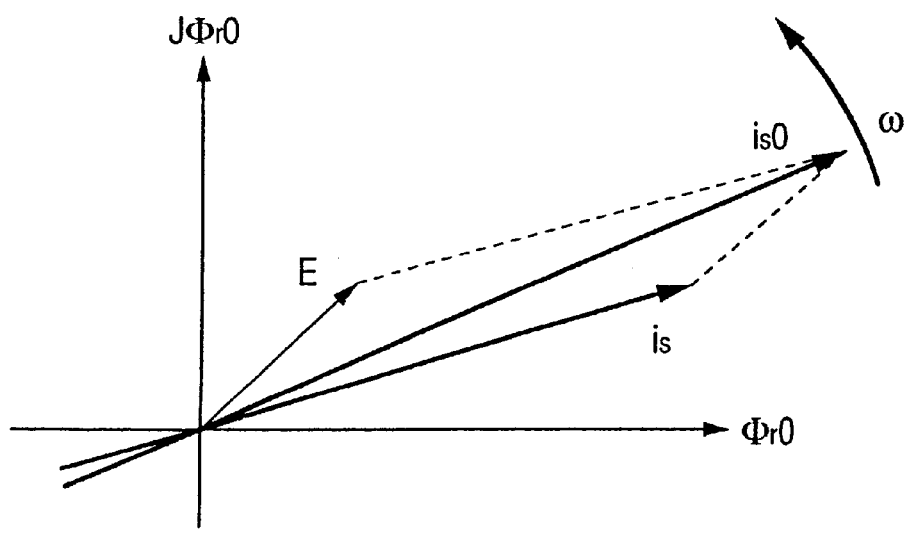
FIG. 16 is a vector diagram showing a relationship among state deviation E, primary current is, and estimated primary current estimated primary current is 0.
Figure 17:
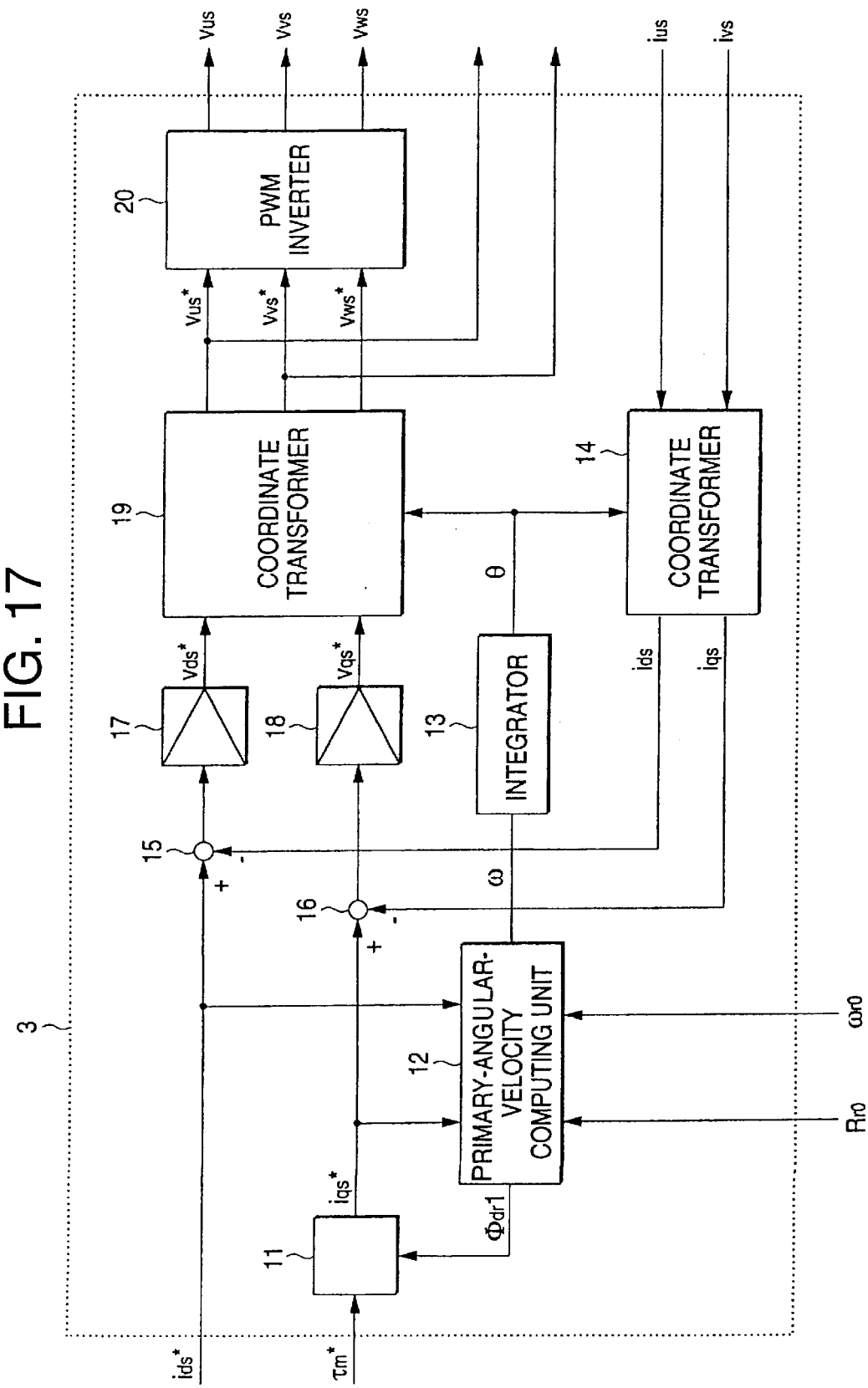
FIG. 17 is a diagram showing the detail of the torque control means.

As already described in connection with FIG. 15, the T-type equivalent circuit is valid for the frequency component of each ω. Therefore, it is easier to estimate the angular velocity and the secondary resistance with increase of the number of the frequency components of the ω.

For this reason, the excitation-current command computing means 1c (not shown) may be used in place of the excitation-current command computing means 1 (1a, 1b) used in the above-mentioned embodiments.

The excitation-current command computing means 1c uses the following equation (33) for computing the excitation current command excitation current ids*, in place of the equation (20).

[Formula 22]

$$i_{ds}^* = \{1 + A_c \cos(2\pi f_c t + m_f \sin 2\pi f_m t)\}\phi_{dr}^* \div M \quad (33)$$

Ac cos(2πfct+mf sin 2π fmt) in the equation (33) is a general mathematical expression describing an FM wave in which a signal of a sine wave is frequency-modulated. Further, mf is a degree of phase variation of the FM wave as an angular modulation wave (this degree is called a modulation index).

The frequency bands of the FM wave are infinite in number. The number of side bands containing 90% or more of generated spectra may be estimated. The side band BW of the FM wave is mathematically expressed by the following equation (34).

$$BW = 2(mf+1)fm \ (Hz) \quad (34)$$

Figure 13:
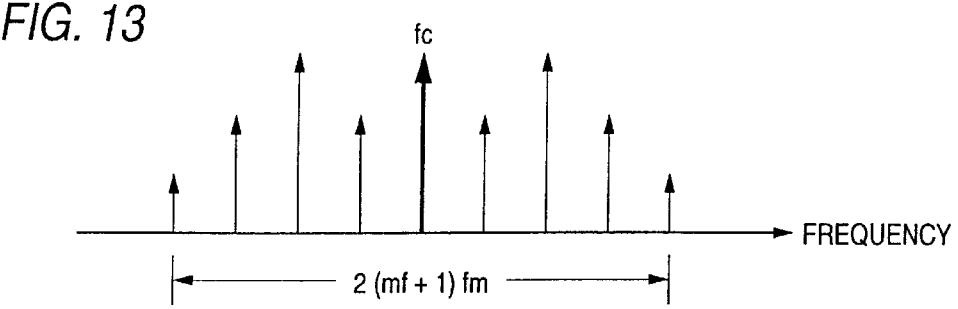
FIG. 13 is a spectrum diagram showing the frequency components of an AC signal used in an embodiment 5 of the invention.
Figure 14:
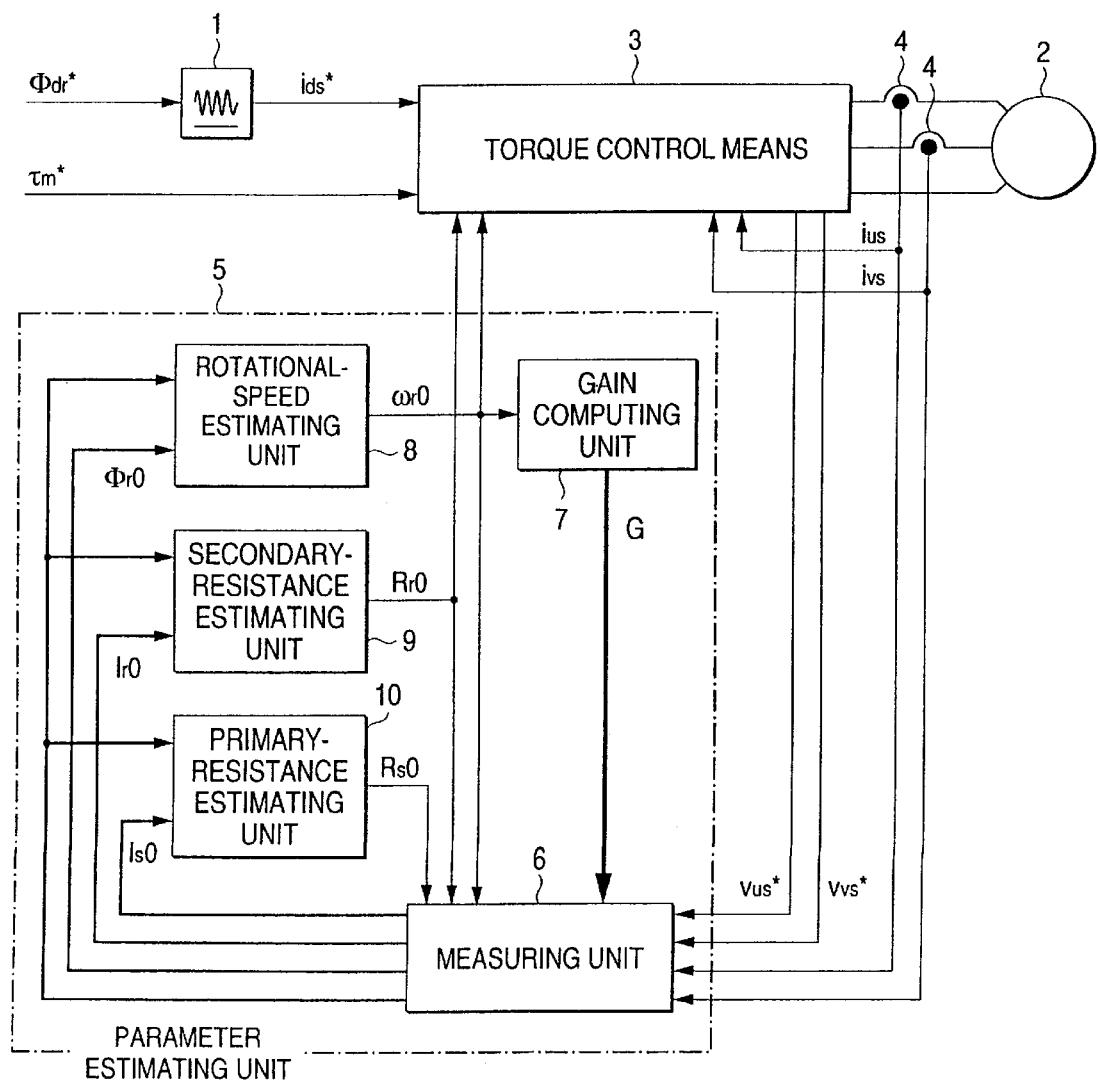
FIG. 14 is a block diagram showing an arrangement of a conventional control system for an induction motor.

A spectrum diagram of the superposing AC signal given by the equation (33) is shown in FIG. 13. As seen from the diagram, where the equation (33) is used, the superposing AC signal contains a plurality of frequency components within a range of the frequency band width 2(mf+1).

Therefore, an AC signal containing at least 3 different frequency components can be superposed on the DC signal is possible by operating a trigonometric function two times. This results in a simple arrangement of the operation circuit and reduction of operation time.

This leads to solution of the problem 4).

If fc, mf and fm are selected so as to satisfy 1/Tr<fc−(mf+1)fm, an AC signal containing a plurality of frequency components but not containing AC components of which the periods are longer than the secondary time constant of the induction motor may be superposed on the DC signal.

In a first broad aspect of the present invention, there is provided a first control system for an induction motor comprising: current detecting means for detecting a primary current of an induction motor; excitation-current command computing means for receiving a secondary magnetic flux command to be output by the induction motor, and processing an AC signal and a DC signal proportional to the secondary magnetic flux command, to thereby produce an excitation current command of the induction motor; torque control means for receiving a torque command to be output by the induction motor and the excitation current command, and processing the estimated rotation angular velocity, the estimated secondary resistance and the primary current, and the torque control means controlling a primary voltage of the induction motor so that an output torque of the induction motor follows the torque command; first parameter estimating means for processing estimated primary resistance, the primary voltage and the primary current of the induction motor, to thereby produce the estimated rotation angular velocity and the estimated secondary resistance; and second parameter estimating means for processing the estimated rotation angular velocity, the estimated secondary resistance, the primary voltage and the primary current, to thereby produce the estimated primary resistance.

In the thus constructed induction-moor control system, the first parameter estimating means includes a) a first measuring unit for processing the estimated primary resistance, the estimated secondary resistance, the estimated rotation angular velocity, a first feedback gain, the primary voltage and the primary current, to thereby produce estimated secondary current, estimated secondary magnetic flux and first state deviation, b) a rotational-speed estimating unit for processing the first state deviation and the estimated secondary magnetic flux, which are derived from the first measuring unit, to thereby produce the estimated rotation angular velocity, c) a secondary-resistance estimating unit for processing the first state deviation and the estimated secondary current, which are derived from the first measuring unit, to thereby produce the estimated secondary resistance, and d) a first gain computing unit for processing the estimated rotation angular velocity derived from the rotational-speed estimating unit, to thereby produce the first feedback gain so that the first state deviation contains a component orthogonal to the estimated secondary magnetic flux.

Further, the second parameter estimating unit includes a) a second measuring unit for processing the estimated primary resistance, the secondary resistance, the estimated rotation angular velocity, a second feedback gain, the primary voltage, and the primary current, to thereby produce an estimated primary current and a second state deviation, b) a primary-resistance estimating unit for processing the second state deviation and the estimated primary current, thereby produce the estimated primary resistance, and c) second gain computing unit for processing the rotation angular velocity derived from the rotational-speed estimating unit, to thereby produce the second state deviation so that the first state deviation contains a component being in phase with the estimated primary current.

The first induction-motor control system is thus constructed produces the following advantages.

The estimated rotation angular velocity, the estimated secondary resistance and the estimated primary resistance can be obtained in good conditions. Therefore, the values of those factors obtained are stable and accurate. The torque control means stably and accurately controls the output torque.

In the first control system, the secondary-resistance estimating unit processes the first state deviation, the estimated secondary magnetic flux and the estimated secondary current, which are derived from the first measuring unit, to thereby produce an estimated secondary resistance . Therefore, the rotation angular velocity and the secondary resistance can be estimated in well separated manner.

Also in the first induction-motor control system, the secondary-resistance estimating unit executes a process by use of the product of a component being in phase with an estimated secondary magnetic flux contained the first state deviation and another component being in phase with the estimated secondary magnetic flux contained in the estimated secondary current, to thereby produce an estimated secondary resistance . Therefore, stable and accurate estimation of the secondary resistance is ensured.

In the first induction-motor control system, the secondary-resistance estimating unit operates the following equation (1) defining the estimated secondary resistance. Therefore, stable and highly accurate operation of the estimated secondary resistance is secured.

In a second broad aspect of the present invention, there is provided a second control system for an induction motor comprising: current detecting means for detecting a primary current of an induction motor; excitation-current command computing means for receiving a secondary magnetic flux command to be output by the induction motor, and executing a process by use of the secondary magnetic flux command, to thereby produce an excitation current command of the induction motor;

torque control means for receiving a torque command to be output by the induction motor and the excitation current command, and processing the estimated rotation angular velocity, the estimated secondary resistance and the primary current, and the torque control means controlling a primary voltage of the induction motor in accordance with the result of the processing so that an output torque of the induction motor follows the torque command; first parameter estimating means for processing estimated primary resistance, the estimated secondary resistance, the primary voltage and the primary current of the induction motor, to thereby produce the estimated rotation angular velocity; and second parameter estimating means for processing the estimated rotation angular velocity, the primary voltage and the primary current, to thereby produce the estimated primary resistance and the estimated secondary resistance.

In the induction-motor system control, the first parameter estimating means includes a) a first measuring unit for processing the estimated primary resistance, the estimated secondary resistance, the estimated rotation angular velocity, a first feedback gain, the primary voltage and the primary current, to thereby produce an estimated secondary magnetic flux and a first state deviation, b) a rotational-speed estimating unit for processing the first state deviation and the estimated secondary magnetic flux, which are derived from the first measuring unit, to thereby produce the estimated rotation angular velocity, c) a first gain computing unit for processing the estimated rotation angular velocity derived from the rotational-speed estimating unit, to thereby produce the first feedback gain so that the first state deviation contains a component orthogonal to the estimated secondary magnetic flux.

The second parameter estimating unit includes a) a second measuring unit for processing the estimated primary resistance, the secondary resistance, the estimated rotation angular velocity, a second feedback gain, the primary voltage, and the primary current, to thereby produce an estimated primary current and a second state deviation, b) a primary-resistance estimating unit for processing the second state deviation and the estimated primary current, to thereby produce the estimated primary resistance, and c) a secondary-resistance estimating unit for processing the estimated primary resistance derived from the primary-resistance estimating unit, to thereby produce the estimated secondary resistance, d) a second gain computing unit for processing the rotation angular velocity derived from the rotational-speed estimating unit, to thereby produce the second state deviation so that the first state deviation contains a component being in phase with the estimated primary current.

Therefore, the estimated rotation angular velocity, the estimated primary resistance and the estimated secondary resistance can be produced in good conditions, and hence those estimated values are stable and accurate Further, the torque control means can control the output torque stably and highly accurately.

In any of the first and second inductor-motor control system, when a deviation is produced between the rotation angular velocity and the estimated rotation angular velocity of the induction motor, the first gain computing unit produces a first feedback gain causing a component orthogonal to the estimated secondary flux contained in a first state deviation, and when a deviation is produced between the primary resistance and the estimated primary resistance of the induction motor, the second gain computing unit produces a second feedback gain causing a component being in phase with the estimated primary flux contained in a second state deviation. Therefore, the first and second parameter estimating means can produce those estimated values in stable and accurate conditions.

In any of the first and second induction-motor control system, the first measuring unit performs the operations of equations (2), (3) and (4), the first gain computing unit performs the operation of an equation (5) defining the first feedback gain, the rotational-speed estimating unit performs the operation of an equation (6) defining the estimated rotation angular velocity, the second measuring unit performs the operations of equations (7), (8) and (9), the second gain computing unit performs the operation of an equation (10) defining the second feedback gain, and the primary-resistance estimating unit performs the operation of an equation (11) defining the primary resistance. Therefore, the operations for the estimated rotation angular velocity and the estimated primary resistance are stable and accurate.

Further, the mathematical expression defining the estimated rotation angular velocity is an equation (6A) which is formed by dividing the equation (6) by the reciprocal number of the square of the estimated secondary flux, and the mathematical expression defining the estimated primary resistance is an equation (11A) which is formed by dividing the equation (11) by the reciprocal number of the square of the estimated primary current.

The gains of the rotational-speed estimating unit and the primary-resistance estimating unit are invariable to provide stable dynamic characteristics.

According to a third broad aspect of the present invention, there is provided a control system for an induction motor comprising: current detecting means for detecting a primary current of an induction motor; excitation-current command computing means for receiving a secondary magnetic flux command to be output by the induction motor, and processing an AC signal and a DC signal proportional to the secondary magnetic flux command, to thereby produce an excitation current command of the induction motor; torque control means for receiving a torque command to be output by the induction motor and the excitation current command, and processing the estimated rotation angular velocity, the estimated secondary resistance and the primary current, and the torque control means controlling a primary voltage of the induction motor so that an output torque of the induction motor follows the torque command; parameter estimating means for processing the primary voltage and the primary current of the induction motor, to thereby produce the estimated rotation angular velocity and the estimated secondary resistance.

In the induction-motor control system, the parameter estimating means includes a) a measuring unit for processing estimated primary resistance, the estimated secondary resistance, the estimated rotation angular velocity, a feedback gain, the primary voltage and the primary current, to thereby produce estimated secondary current, estimated secondary magnetic flux and state deviation, b) a rotational-speed estimating unit for processing the state deviation and the estimated secondary magnetic flux, which are derived from the measuring unit, to thereby produce the estimated rotation angular velocity, c) a secondary-resistance estimating unit for processing the state deviation, the estimated secondary magnetic flux, and the estimated secondary current, which are derived from the measuring unit, to thereby produce the estimated secondary resistance, and d) a primary-resistance estimating unit for processing the estimated secondary resistance derived from the secondary-resistance estimating unit, to thereby produce the estimated primary resistance, e) a gain computing unit for processing the estimated rotation angular velocity derived from the rotational-speed estimating unit, to thereby produce the feedback gain so that the state deviation contains a component orthogonal to the estimated secondary magnetic flux, f) when a deviation is produced between the rotation angular velocity and the estimated rotation angular velocity of the induction motor, the gain computing unit produces a feedback gain causing a component orthogonal to the estimated secondary flux contained in the state deviation, and, g) the secondary-resistance estimating unit executes a process by use of the product of a component being in phase with an estimated secondary magnetic flux contained the state deviation and another component being in phase with the estimated secondary magnetic flux contained in the estimated secondary current, to thereby produce an estimated secondary resistance Therefore, the estimated rotation angular velocity, the estimated secondary resistance and the estimated primary resistance can be produced in good conditions and hence their estimated values are stable and accurate. The torque control means can control the output torque stably and accurately.

An induction-motor control system, wherein the measuring unit performs the operations of equations (14), (15) and (16), the gain computing unit performs the operation of an equation (17) defining the feedback gain, the rotational-speed estimating unit performs the operation of an equation

(18) defining the estimated rotation angular velocity (18), and the secondary-resistance estimating unit performs the operation of an equation (19) defining the estimated secondary resistance. Stable and highly accurate operations of the estimated rotation angular velocity, the estimated secondary resistance and the estimated primary resistance can be performed.

In any of the first to third induction-motor control system, excitation-current command computing means receives a secondary magnetic flux command to be output by the induction motor, and processes an AC signal not containing AC components whose periods are longer than a secondary time constant of the induction motor, and a DC signal proportional to the secondary magnetic flux command, to thereby produce an excitation current command of the induction motor. Therefore, the secondary magnetic flux can be kept constant, and a pulsation of the output torque can be suppressed.

In any of the first to third induction-motor control system, excitation-current command computing means receives a secondary magnetic flux command to be output by the induction motor, and processes an AC signal formed by frequency modulating a sine wave signal, and a DC signal proportional to the secondary magnetic flux command, to thereby produce an excitation current command of the induction motor . Therefore, the required number of trigonometric operations is reduced. It is allowed that an increased number of AC signals of different frequencies are superposed on the DC signal. Accuracy of estimating the rotation angular velocity and the secondary resistance is improved.

What is claimed is:

1. A control system for an induction motor comprising:

current detecting means for detecting a primary current of an induction motor;

excitation-current command computing means for receiving a secondary magnetic flux command to be output by the induction motor, and processing an AC signal and a DC signal proportional to said secondary magnetic flux command, to thereby produce an excitation current command of the induction motor;

torque control means for receiving a torque command to be output by the induction motor and said excitation current command, and processing said estimated rotation angular velocity, said estimated secondary resistance and said primary current, and said torque control means controlling a primary voltage of the induction motor so that an output torque of the induction motor follows said torque command;

first parameter estimating means for processing estimated primary resistance, said primary voltage and said primary current of the induction motor, to thereby produce said estimated rotation angular velocity and said estimated secondary resistance; and second parameter estimating means for processing said estimated rotation angular velocity, said estimated secondary resistance, said primary voltage and said primary current, to thereby produce said estimated primary resistance, wherein said first parameter estimating means includes a) a first measuring unit for processing said estimated primary resistance, said estimated secondary resistance, said estimated rotation angular velocity, a first feedback gain, said primary voltage and said primary current, to thereby produce estimated secondary current, estimated secondary magnetic flux and first state deviation, b) a rotational-speed estimating unit for processing said first state deviation and said estimated secondary magnetic flux, which are derived from said first measuring unit, to thereby produce said estimated rotation angular velocity, c) a secondary-resistance estimating unit for processing said first state deviation and said estimated secondary current, which are derived from said first measuring unit, to thereby produce said estimated secondary resistance, and d) a first gain computing unit for processing said estimated rotation angular velocity derived from said rotational-speed estimating unit, to thereby produce said first feedback gain so that said first state deviation contains a component orthogonal to said estimated secondary magnetic flux, and said second parameter estimating unit includes a) a second measuring unit for processing said estimated primary resistance, said secondary resistance, said estimated rotation angular velocity, a second feedback gain, said primary voltage, and said primary current, to thereby produce an estimated primary current and a second state deviation, b) a primary-resistance estimating unit for processing said second state deviation and said estimated primary current, thereby produce said estimated primary resistance, and c) a second gain computing unit for processing said rotation angular velocity derived from said rotational-speed estimating unit, to thereby produce said second state deviation so that said first state deviation contains a component being in phase with said estimated primary current.

2. The induction-motor control system according to claim 1, wherein said secondary-resistance estimating unit processes said first state deviation, said estimated secondary magnetic flux and said estimated secondary current, which are derived from said first measuring unit, to thereby produce an estimated secondary resistance.

3. The induction-motor control system according to claim 2, wherein said secondary-resistance estimating unit executes a process by use of the product of a component in phase with an estimated secondary magnetic flux contained said first state deviation and another component in phase with said estimated secondary magnetic flux contained in said estimated secondary current, to produce an estimated secondary resistance.

4. The induction-motor control system according to claim 3, wherein said secondary-resistance estimating unit employs the following equation (1) to define said estimated secondary resistance:

$$R_{r0} = -\frac{k_{r2p}s + k_{r2i}}{s} \frac{(i_{r0I} \cdot \Phi_{r0I})(E_1 \cdot \Phi_{r0I})}{|\Phi_{r0I}|^2} \quad (1)$$

$$i_{r0I} = \begin{pmatrix} i_{arI} \\ i_{brI} \end{pmatrix}$$

$$\Phi_{r0I} = \begin{pmatrix} \phi_{arI} \\ \phi_{brI} \end{pmatrix}$$

where

Rr0: estimated secondary resistance s: Laplace operator kr2p: secondary-resistance defining proportional gain
kr2I: secondary-resistance defining integration gain
ir01: estimated secondary current of the induction motor
iar1: a-axis component of the estimated secondary current of the induction motor on the a-b axis coordinates
ibr1: b-axis component of the estimated secondary current of the induction motor on the a-b axis coordinates of the induction motor
φr01: estimated secondary magnetic flux of the induction motor
Øar1: a-axis component of the estimated secondary magnetic flux of the induction motor on the a-b axis coordinates
Øbr1: b-axis component of the estimated secondary magnetic flux of the induction motor on the a-b axis coordinates
E1: first state deviation E1
•: operator indicative of the inner product of vectors.

5. A control system for an induction motor comprising:
current detecting means for detecting a primary current of an induction motor;
excitation-current command computing means for receiving a secondary magnetic flux command to be output by the induction motor, and executing a process by use of said secondary magnetic flux command, to thereby produce an excitation current command of the induction motor;
torque control means for receiving a torque command to be output by the induction motor and said excitation current command, and processing said estimated rotation angular velocity, said estimated secondary resistance and said primary current, and said torque control means controlling a primary voltage of the induction motor in accordance with the result of the processing so that an output torque of the induction motor follows said torque command;
first parameter estimating means for processing estimated primary resistance, said estimated secondary resistance, said primary voltage and said primary current of the induction motor, to thereby produce said estimated rotation angular velocity; and
second parameter estimating means for processing said estimated rotation angular velocity, said primary voltage and said primary current, to thereby produce said estimated primary resistance and said estimated secondary resistance
wherein
said first parameter estimating means includes
a) a first measuring unit for processing said estimated primary resistance, said estimated secondary resistance, said estimated rotation angular velocity, a first feedback gain, said primary voltage and said primary current, to thereby produce an estimated secondary magnetic flux and a first state deviation,
b) a rotational-speed estimating unit for processing said first state deviation and said estimated secondary magnetic flux, which are derived from said first measuring unit, to thereby produce said estimated rotation angular velocity,
c) a first gain computing unit for processing said estimated rotation angular velocity derived from said rotational-speed estimating unit, to thereby produce said first feedback gain so that said first state deviation contains a component orthogonal to said estimated secondary magnetic flux, and said second parameter estimating unit includes
a) a second measuring unit for processing said estimated primary resistance, said secondary resistance, said estimated rotation angular velocity, a second feedback gain, said primary voltage, and said primary current, to thereby produce an estimated primary current and a second state deviation,
b) a primary-resistance estimating unit for processing said second state deviation and said estimated primary current, to thereby produce said estimated primary resistance, and
c) a secondary-resistance estimating unit for processing said estimated primary resistance derived from said primary-resistance estimating unit, to thereby produce said estimated secondary resistance,
d) a second gain computing unit for processing said rotation angular velocity derived from said rotational-speed estimating unit, to thereby produce said second state deviation so that said first state deviation contains a component being in phase with said estimated primary current.

6. The induction-motor control system according to claim 1 wherein when a deviation is produced between said rotation angular velocity and said estimated rotation angular velocity of the induction motor, said first gain computing unit produces a first feedback gain causing a component orthogonal to said estimated secondary flux contained in a first state deviation, and when a deviation is produced between said primary resistance and said estimated primary resistance of the induction motor, said second gain computing unit produces a second feedback gain causing a component to be in phase with said estimated primary flux contained in a second state deviation.

7. The induction-motor control system according to claim 1, wherein said first measuring unit performs the operations of equations (2), (3) and (4), said first gain computing unit performs the operation of equation (5) defining said first feedback gain, said rotational-speed estimating unit performs the operation of equation (6) defining said estimated rotation angular velocity, said second measuring unit performs the operations of equations (7), (8) and (9), said second gain computing unit performs the operation of equation (10) defining said second feedback gain, and said primary-resistance estimating unit performs the operation of an equation (11) defining said primary resistance:

$$\frac{d}{dt}\begin{pmatrix}\Phi_{s01}\\ \Phi_{r01}\end{pmatrix} = A\begin{pmatrix}\Phi_{s01}\\ \Phi_{r01}\end{pmatrix} + Bv_s - H_1 E_1 \tag{2}$$

$$\begin{pmatrix}i_{s01}\\ i_{r01}\end{pmatrix} = C_1\begin{pmatrix}\Phi_{s01}\\ \Phi_{r01}\end{pmatrix} \tag{3}$$

$$E_1 = i_{s01} - i_s \tag{4}$$

$$H_1 = P_1 C^T R^{-1} \tag{5}$$

$$\omega_{r0} = \frac{k_{sp}s + k_{si}}{s}(J\Phi_{r01})^T E_1 \tag{6}$$

$$\frac{d}{dt}\begin{pmatrix}\Phi_{s02}\\ \Phi_{r02}\end{pmatrix} = A\begin{pmatrix}\Phi_{s02}\\ \Phi_{r02}\end{pmatrix} + Bv_s - H_2 E_2 \tag{7}$$

$$i_{s02} = C\begin{pmatrix}\Phi_{s02}\\ \Phi_{r02}\end{pmatrix} \tag{8}$$

$$E_2 = i_{s02} - i_s \tag{9}$$

-continued $$H_2 = P_2 C^T R^{-1} \quad (10)$$

$$R_{sO} = -\frac{k_{rIp}s + k_{rIi}}{s}(i_{s02} \cdot E_2) \quad (11)$$

where $$A = \begin{pmatrix} a_{11}I & a_{12}I \\ a_{21}I & a_{22}I + \omega_{r0}J \end{pmatrix} \quad v_s = \begin{pmatrix} v_{as} \\ v_{bs} \end{pmatrix}$$

$$B = \begin{pmatrix} I \\ 0 \end{pmatrix} \quad i_s = \begin{pmatrix} i_{as} \\ i_{bs} \end{pmatrix}$$

$$C_1 = \begin{pmatrix} c_{11}I & c_{12}I \\ c_{21}I & c_{22}I \end{pmatrix} \quad i_{s01} = \begin{pmatrix} i_{as1} \\ i_{bs1} \end{pmatrix}$$

$$C = (c_{11}I \quad c_{12}I) \quad i_{s02} = \begin{pmatrix} i_{as2} \\ i_{bs2} \end{pmatrix}$$

$$\zeta^{-1} = \frac{1}{L_s L_r - M^2} \quad \Phi_{s01} = \begin{pmatrix} \phi_{as1} \\ \phi_{b1s} \end{pmatrix}$$

$$a_{11} = -\zeta^{-1} L_r R_{sO} \quad \Phi_{s02} = \begin{pmatrix} \phi_{as2} \\ \phi_{bs2} \end{pmatrix}$$

$$a_{12} = \zeta^{-1} M R_{sO} \quad \Phi_{r02} = \begin{pmatrix} \phi_{ar2} \\ \phi_{br2} \end{pmatrix}$$

$$a_{21} = \zeta^{-1} M R_{rO} \quad I = \begin{pmatrix} 1 & 0 \\ 0 & 1 \end{pmatrix}$$

$$a_{22} = -\zeta^{-1} L_s R_{rO} \quad J = \begin{pmatrix} 0 & -1 \\ 1 & 0 \end{pmatrix}$$

$$c_{11} = \zeta^{-1} L_r$$

$$c_{12} = -\zeta^{-1} M$$

$$c_{21} = -\zeta^{-1} M$$

$$c_{22} = \zeta^{-1} L_s$$

$$0 = \begin{pmatrix} 0 & 0 \\ 0 & 0 \end{pmatrix}$$

ωr0: estimated rotational angular velocity of the induction motor
$k_{sp}$: rotation-angular-velocity defining proportional gain
$k_{si}$: rotation-angular-velocity defining integration gain
$R_{sO}$: estimated primary secondary resistance
$k_{r1p}$: primary-resistance defining gain
$k_{r1i}$: primary-resistance integration gain
$v_s$: primary voltage of the induction motor
$v_{as}$: a-axis component on the a-b axes plane (static coordinates) of the primary voltage of the induction motor
$v_{bs}$: b-axis component on the a-b axes plane (static coordinates) of the primary voltage of the induction motor
$\Phi_{s01}$: estimated primary magnetic flux of the induction motor
$\phi_{as1}$: a-axis component on the a-b axes plane (static coordinates) of the estimated primary magnetic flux of the induction motor
$\phi_{bs1}$: b-axis component on the a-b axes plane (static coordinates) of the second estimated primary magnetic flux of the induction motor
$\Phi_{s02}$: second estimated primary magnetic flux of the induction motor
$\phi_{as2}$: a-axis component on the a-b axes plane (static coordinates) of the second estimated primary magnetic flux of the induction motor
$\phi_{bs2}$: b-axis component on the a-b axes plane (static coordinates) of the second estimated primary magnetic flux of the induction motor
$\Phi_{r02}$: second estimated secondary magnetic flux of the induction motor
$\phi_{ar2}$: a-axis component on the a-b axes plane (static coordinates) of the second estimated secondary magnetic flux of the induction motor
$\phi_{br2}$: b-axis component on the a-b axes plane (static coordinates) of the second estimated secondary magnetic flux of the induction motor
$i_s$: primary current of the induction motor
$i_{as}$: a-axis component on the a-b axes (static coordinates) of the primary current of the induction motor
$i_{bs}$: b-axis component on the a-b axes plane (static coordinates) of the primary current of the induction motor
$i_{s01}$: first estimated primary current of the induction motor
$i_{as1}$: a-axis component on the a-b axes plane (static coordinates) of the first estimated primary current of the induction motor
$i_{bs1}$: b-axis component on the a-b axes plane (static coordinates) of the first estimated primary current of the induction motor
$i_{s02}$: estimated primary current of the induction motor
$i_{as2}$: a-axis component on the a-b axes plane (static coordinates) of the estimated primary current of the induction motor
$i_{bs2}$: b-axis component on the a-b axes plane (static coordinates) of the estimated primary current of the induction motor
E2: second state deviation
H1: first feedback gain
H2: second feedback gain
P1: solution of the equation (12)
P2 solution of the equation (13)
$L_s$: primary inductance of the induction motor
$L_r$: secondary inductance of the induction motor
M: mutual inductance of the induction motor
ε: arbitrary positive number $$P_1 A^T + A P_1 - P_1 C^T R^{-1} C P + G_1 Q G_1^T = 0 \quad (12)$$

$$G_1 = \begin{pmatrix} 0 & 0 \\ 0 & J \end{pmatrix} \quad Q_1 = \begin{pmatrix} I & 0 \\ 0 & I \end{pmatrix} \quad R = \varepsilon I$$

$$P_2 A^T + A P_2 - P_2 C^T R^{-1} C P + G_2 Q G_2^T = 0 \quad (13)$$

$$G_2 = \begin{pmatrix} \frac{a_{11}}{Z}I & \frac{a_{12}}{Z}I \\ 0 & 0 \end{pmatrix}$$

$$Z = \sqrt{a_{11}^2 + a_{12}^2}$$

8. An induction-motor control system according to claim 7, wherein the mathematical expression defining said estimated rotation angular velocity is equation (6A) which is formed by dividing said equation (6) by the reciprocal of the square of said estimated secondary flux, and the mathematical expression defining said estimated primary resistance is equation (11A) which is formed by dividing said equation (1) by the reciprocal of the square of said estimated primary current:

$$\omega_{r0} = \frac{k_{sp}s + k_{si}}{s}(J\Phi_{r01})^T \frac{E_1}{|\Phi_{r01}|^2} \quad (6A)$$

$$R_{s0} = -\frac{k_{rlp}s + k_{rli}}{s}i_{s02} \cdot \frac{E_2}{|i_{s02}|^2} \quad (11A)$$

9. The induction-motor control system according to claim 1, wherein excitation-current command computing means receives a secondary magnetic flux command to be output by the induction motor, and processes an AC signal not containing AC components whose periods are longer than a secondary time constant of said induction motor, and a DC signal proportional to said secondary magnetic flux command, to produce an exitation current command of the induction motor.

10. The induction-motor control system according to claim 1, wherein excitation-current command computing means receives a secondary magnetic flux command to be output by the induction motor, and processes an AC signal formed by frequency modulating a sine wave signal, and a DC signal proportional to said secondary magnetic flux command, to produce an excitation current command of the induction motor.

11. The induction-motor control system according to claim 5, wherein when a deviation is produced between said rotation angular velocity and said estimated rotation angular velocity of the induction motor, said first gain computing unit produces a first feedback gain causing a component orthogonal to said estimated secondary flux contained in a first state deviation, and when a deviation is produced between said primary resistance and said estimated primary resistance of the induction motor, said second gain computing unit produces a second feedback gain causing a component to be in phase with said estimated primary flux contained in a second state deviation.

12. The induction-motor control system according to claim 5, wherein excitation-current command computing means receives a secondary magnetic flux command to be output by the induction motor, and processes an AC signal not containing AC components whose periods are longer than a secondary time constant of said induction motor, and a DC signal proportional to said secondary magnetic flux command, to produce an excitation current command of the induction motor.

13. The induction-motor control system according to claim 5, wherein excitation-current command computing means receives a secondary magnetic flux command to be output by the induction motor, and processes an AC signal formed by frequency modulating a sine wave signal, and a DC signal proportional to said secondary magnetic flux command, to produce an excitation current command of the induction motor.

14. A control system for an induction motor comprising:
current detecting means for detecting a primary current of an induction motor;
excitation-current command computing means for receiving a secondary magnetic flux command to be output by the induction motor, and processing an AC signal and a DC signal proportional to said secondary magnetic flux command, to thereby produce an excitation current command of the induction motor;
torque control means for receiving a torque command to be output by the induction motor and said excitation current command, and processing said estimated rotation angular velocity, said estimated secondary resistance and said primary current, and said torque control means controlling a primary voltage of the induction motor so that an output torque of the induction motor follows said torque command;

parameter estimating means for processing said primary voltage and said primary current of the induction motor, to thereby produce said estimated rotation angular velocity and said estimated secondary resistance, wherein said parameter estimating means includes a) a measuring unit for processing estimated primary resistance, said estimated secondary resistance, said estimated rotation angular velocity, a feedback gain, said primary voltage and said primary current, to thereby produce estimated secondary current, estimated secondary magnetic flux and state deviation, b) a rotational-speed estimating unit for processing said state deviation and said estimated secondary magnetic flux, which are derived from said measuring unit, to thereby produce said estimated rotation angular velocity, c) a secondary-resistance estimating unit for processing said state deviation, said estimated secondary magnetic flux, and said estimated secondary current, which are derived from said measuring unit, to thereby produce said estimated secondary resistance, d) a primary-resistance estimating unit for processing said estimated secondary resistance derived from said secondary-resistance estimating unit, to thereby produce said estimated primary resistance, e) a gain computing unit for processing said estimated rotation angular velocity derived from said rotational-speed estimating unit, to thereby produce said feedback gain so that said state deviation contains a component orthogonal to said estimated secondary magnetic flux, f) when a deviation is produced between said rotation angular velocity and said estimated rotation angular velocity of the induction motor, said gain computing unit produces a feedback gain causing a component orthogonal to said estimated secondary flux contained in said state deviation, and, g) said secondary-resistance estimating unit executes a process by use of the product of a component being in phase with an estimated secondary magnetic flux contained said state deviation and another component being in phase with said estimated secondary magnetic flux contained in said estimated secondary current, to thereby produce an estimated secondary resistance.

15. The induction-motor control system according to claim 14, wherein said measuring unit performs the operations of equations (14), (15) and (16), said gain computing unit performs the operation of equation (17) defining said feedback gain, said rotational-speed estimating unit performs the operation of equation (18) defining said estimated rotation angular velocity, and said secondary-resistance estimating unit performs the operation of equation (19) defining said estimated secondary resistance:

$$\frac{d}{dt}\begin{pmatrix}\Phi_{s0I}\\\Phi_{r0I}\end{pmatrix}=A\begin{pmatrix}\Phi_{s0I}\\\Phi_{r0I}\end{pmatrix}+Bv_s-HE \quad (14)$$

$$\begin{pmatrix}i_{s02}\\i_{r0I}\end{pmatrix}=C_1\begin{pmatrix}\Phi_{s0I}\\\Phi_{r0I}\end{pmatrix} \quad (15)$$

$$E=i_{s02}-i_s \quad (15)$$
$$H=P_1C^TR^{-1} \quad (16)$$

$$\omega_{r0}=\frac{k_{sp}s+k_{si}}{s}(J\Phi_{r0I})^T\frac{E}{|\Phi_{r0I}|^2} \quad (18)$$

$$R_{r0}=-\frac{k_{r2p}s+k_{r2i}}{s}(i_{r0I}\cdot\Phi_{r0I})\frac{(E\cdot\Phi_{r0I})}{|\Phi_{r0I}|^2} \quad (19)$$

where
E: state deviation
H: feedback gain.

16. The induction-motor control system according to claim 14, wherein excitation-current command computing means receives a secondary magnetic flux command to be output by the induction motor, and processes an AC signal not containing AC components whose periods are longer than a secondary time constant of said induction motor, and a DC signal proportional to said secondary magnetic flux command, to produce an excitation current command of the induction motor.

17. The induction-motor control system according to claim 14, wherein excitation-current command computing means receives a secondary magnetic flux command to be output by the induction motor, and processes an AC signal formed by frequency modulating a sine wave signal, and a DC signal proportional to said secondary magnetic flux command, to produce an excitation current command of the induction motor.

* * * * *